US012749989B2

(12) United States Patent
Salmon

(10) Patent No.: US 12,749,989 B2
(45) Date of Patent: Sep. 29, 2026

(54) GRID CONNECTED CONVERTER DEVICE

(71) Applicant: ELEAPPOWER LTD., Toronto (CA)

(72) Inventor: John Salmon, Edmonton (CA)

(73) Assignee: ELEAPPOWER Ltd., Toronto (CA)

( * ) Notice: Subject to any disclaimer, the term of this patent is extended or adjusted under 35 U.S.C. 154(b) by 0 days.

(21) Appl. No.: 19/106,518

(22) PCT Filed: Aug. 25, 2023

(86) PCT No.: PCT/CA2023/051128
§ 371 (c)(1),
(2) Date: Feb. 25, 2025

(87) PCT Pub. No.: WO2024/040355
PCT Pub. Date: Feb. 29, 2024

(65) Prior Publication Data

US 2026/0005623 A1 Jan. 1, 2026

Related U.S. Application Data

(60) Provisional application No. 63/400,875, filed on Aug. 25, 2022.

(51) Int. Cl.
*H02M 7/487* (2007.01)

(52) U.S. Cl.
CPC ......... *H02M 7/487* (2013.01); *B60L 2210/30* (2013.01)

(58) Field of Classification Search
CPC ........................... H02M 7/487; B60L 2210/30
(Continued)

(56) References Cited

U.S. PATENT DOCUMENTS 10,224,834 B2 * 3/2019 Hsin .................. H02M 7/5387
11,557,983 B2 * 1/2023 Zmood ................ H02M 7/483
(Continued)

FOREIGN PATENT DOCUMENTS

CN 110086365 A 8/2019

OTHER PUBLICATIONS

Patent Cooperation Treaty, International Search Report and Written Opinion, Application No. PCT/CA2023/051128, dated Nov. 8, 2023.

*Primary Examiner* — Yemane Mehari
(74) *Attorney, Agent, or Firm* — Norton Rose Fulbright Canada LLP

(57) ABSTRACT

A grid-connected converter device for interfacing a grid network and coupling the grid network to a direct current (DC) source or DC Bus/Network is provided. According to this embodiment, the device includes a neutral-point-clamped inverter circuit having a voltage $v_{dc}$ across the DC source or DC Bus/Network, the neutral-point-clamped inverter circuit including one or more switch legs, each switch leg comprising a corresponding pair of switches having an electrical midpoint between the switches of the pair of switches. Said device further including an inductor network coupled to the neutral-point-clamped inverter circuit, the inductor network comprising a set of parallel inductor legs, each parallel inductor leg coupled to a corresponding electrical midpoint of a corresponding switch leg and also coupled to an output electrical node coupled to the grid network. In a variation, the inductor network can include cross coupled inductors, limbed inductors, or filter inductors.

15 Claims, 26 Drawing Sheets

(58) Field of Classification Search
USPC .......................................................... 363/131
See application file for complete search history.

(56) References Cited

U.S. PATENT DOCUMENTS

| | | | | |
|---|---|---|---|---|
| 2011/0292695 | A1* | 12/2011 | Skibinski .............. | H02M 5/458 363/37 |
| 2013/0163292 | A1* | 6/2013 | Basic .................. | H02M 5/4585 363/34 |
| 2021/0218342 | A1* | 7/2021 | Zmood ................... | H02M 7/23 |
| 2023/0421074 | A1* | 12/2023 | Yu ....................... | H02M 7/5395 |

* cited by examiner

200B

200A

1400C

1400B

1400A

1500C

1500B

1500A

1600A

1600B

1600C

GRID CONNECTED CONVERTER DEVICE

CROSS-REFERENCE

This application is a non-provisional of, and claims all benefit to, U.S. Application No. 63/400,875, entitled "GRID CONNECTED CONVERTER DEVICE", filed 25 Aug. 2022, incorporated herein by reference in its entirety.

FIELD

Embodiments of the present disclosure relate to the field of power electronics, and more specifically, embodiments relate to devices, systems and methods for grid connected converter devices utilizing coupled inductor topologies.

INTRODUCTION

Improved power electronics are useful in providing electrical infrastructure for grid-connected devices. For example, reduced or zero-emission electric vehicles may include energy storage devices, such as batteries or capacitors, which are charged through connections to a power grid. In alternate scenarios, power grid connections can be used in a bi-directional manner.

While reduced or zero-emission electric vehicles are desirable as their adoption would help to resolve or mitigate environmental impacts and/or conserve the natural environment or natural resources relative to internal combustion engines, a challenge faced is that existing electrical infrastructure needs to be adapted, modified, or replaced to be better fit for purpose.

Prior approaches to converter technology, while being simple and low cost, have challenges when operating at higher voltage, for example, due to voltage stress on switches for a given bus voltage. Prior approaches to converters can also introduce a common mode voltage between the grid ground, or neutral point, and the DC bus at the converter output. This common-mode voltage can produce system noise, but also large high-frequency common-mode currents, and thus, improvements are desirable.

SUMMARY

Systems, methods, devices, and corresponding control program instruction sets and/or software for pulse width modulation (PWM) utility grid rectifiers and converters are described in various embodiments herein.

In particular, a grid-connected converter device is described that interfaces networks together, such as an AC network and a DC network/DC bus, the grid-connected converter device having at least a neutral-point clamped (NPC) inverter circuit operating in concert with inductors, which can include, for example, a coupled inductor inverter (CII) circuit (e.g., having converter/inductor modules), a limbed inductor network, or one or more filter inductors. The combination circuit with a coupled inductor inverter can be denoted as the NPC-CII circuit, and different variations and embodiments are introduced herein. The circuit can be used for uni-directional, or bi-directional power flow, depending for example, if switches are used in the NPC inverter circuit stage or if diodes are used in the NPC inverter circuit stage. The grid-connected converter device can be a parallel-connected inverters using separate inductors or coupled inductors. The circuit can interface AC/DC, DC/DC networks, for example.

Three different types of inductor circuit topologies are proposed in different embodiments, each with different benefits and challenges. These are denoted as Type 1, Type 2, and Type 3. The differences between the different topologies is that there can be differences in how flux and inductor sizes are impacted, and the outputs of physical circuit modules can thus be different. The different types of topologies can be useful when adapting the circuit for different use cases having different priorities (e.g., size, cost, complexity). For example, coupling and cross-coupling can be used, and there can be differences in inter-limb and intra-limb leakage flux. There can be different proximity effects, switch/diode stress, etc. Each of these The NPC-CII circuit has benefits in high-power applications where power scaling of grid-connected converter devices is typically achieved by connecting identical converters in parallel. Therefore, when doubling the grid-connected converter power, the number of components is doubled. In the case of NPC-CII circuit, this is not the case, as a doubling of the power enables a reduction in component size and weight, specifically the inductors, among others such as harmonics and electromagnetic interference and compatibility (EMI/EMC).

Potential benefits of the proposed embodiments include modifications in the number of levels of DC and/or AC voltage (depending on the embodiment), which can be useful in shaping voltage (e.g., to be more sine-wave or more DC in shape) and/or lowering harmonic content of fundamental voltages, reducing voltage stress on electrical components, and/or a reduction in the common voltage between the system ground (e.g., grid ground or a common ground if connected to a fleet of vehicles) and the output DC bus (which can be particularly useful when reducing interaction with multiple loads placed on the DC bus). In some scenarios, higher frequency components can be filtered out using common mode filter chokes.

More specifically, the use of coupled inductors allows for smaller inductors (e.g., overall inductor size can be reduced by approximately 20-40% in some cases, or even greater reductions can be achieved, such as approximately a factor of 20-100 relative to approaches with no flux cancellation) to be utilized, reducing a total filter inductor size compared to other approaches, and additional fault and failure handling can occur as phase outputs are independent of one another and the proposed circuits may be adapted for operation despite the failure of an inverter leg.

The cross-sectional area of the inductors can be made smaller, and hence the inductor size can be made to be smaller. For coupled inductors, the power current (DC or AC) does not produce flux in the core, and hence the magnetics can be reduced in size. Reduction of inductor size can be useful in many situations, such as improving the viability of electric vehicle charging infrastructure.

The standard power current is relatively low frequency (e.g., 60 Hz, 400 Hz). In the coupled inductors, switch mode converters still produce high frequency flux nonetheless based on high frequency switching of the inverter (e.g., 20 kHz). The inductor can be made smaller due to the high frequency of the flux, and the coupled inductor network may only yield high frequency flux, which can be addressed with a filter.

The grid-connected converter device can be used practically as a grid interphase for 3-phase electric vehicle (EV) rapid chargers, for example. The described systems, methods, and devices may be considered useful as part of a DC grid power source, for instance, whereby a number of electric vehicles receive DC power for charging their batteries. In some embodiments, the described systems, methods, and devices may be converters or make use thereof. The proposed grid converter device can be used as an interconnector circuit between different power networks.

As certain kinds of EVs may receive both 1-phase or 3-phase AC grid supplies, the presented converters may, in non-limiting practical embodiments, be also considered for use as on vehicle rapid chargers. According to some embodiments, the coupled inductor technology being used may provide that the inductive elements are very small in size. The size of the inductor depends on a power level. For example, using coupled inductors, the inductors could be reduced in size to take up less than 10 $cm^3$, although this number can vary based on a target power level.

3-phase implementations are presented, but the described systems, methods, and devices can equally well be adapted, in some embodiments, for single phase power sources or where a battery charger is connected to either a single or a three phase AC power source, for example. DC grid implementation variations are also contemplated.

The voltage associated with batteries (or other energy storage devices) in EVs is often small relative to the DC voltage being used, e.g., 400 V and 800 V. For example, a situation of interest is where a site provides a DC bus voltage for several vehicles to receive their battery charge. In such a situation, many hundreds of amps are required to be supplied on the DC bus. This necessitates multiple grid interface power converters to be connected in parallel in order to meet the current demand. The described systems, methods, and devices may include the application of converter technology combined with inductors (combined converter/inductor technology). This implementation can reduce the number of switches, which is a practical benefit for deployment.

The systems, methods, and devices presented may, according to some embodiments, make use of coupled inductor technology, to reduce the size of the magnetics, which is desirable, and may provide that:

(a) Power may be drawn from the grid with a high power quality using multi-level voltages with step sizes smaller than the DC bus voltage.

(b) Multi-level voltages with PWM pulse frequencies higher than the converter switching frequency, can allow the grid input filters to be made smaller in size and weight as well as making for a faster transient response.

(c) The inductor magnetics, using coupled inductor technology, may have no flux at the low grid frequency, e.g., 60 Hz, and may only have high frequency components, e.g., 20 kHz, related to the converter switching frequencies. This may allow the inductor magnetics to be drastically reduced in size as compared with standard AC filter inductors, where the low frequency grid current produces flux in the magnetic core(s), for instance.

(d) The smaller line voltage step sizes may reduce the voltage stresses on the input filters, feeder transformer and may reduce many cable interaction issues.

(e) The common mode voltage between the grid ground and the DC bus may be reduced, in some cases vastly reduced, and so reduces ground noise and high frequency currents associated with none isolated grid interface converters.

(f) Some embodiments, take advantage of reduced device voltage stresses as experienced in the NPC converter while providing very high current capabilities using parallel connected modules.

In an aspect, a grid-connected converter device for interfacing an alternating current (AC) network and coupling the AC network to a direct current (DC) source or DC Bus/Network is provided. According to this embodiment, the device includes a neutral-point-clamped inverter circuit having a voltage $v_{dc}$ across the direct current (DC) source or DC Bus/Network.

The neutral-point-clamped inverter circuit can be provided having a first stage having an upper capacitor and a lower capacitor connected across an NPC electrical midpoint, an upper pair of clamping diodes, and a lower pair of clamping diodes, the upper and lower pair of clamping diodes coupled across the NPC electrical midpoint. Diodes are used for unidirectional power transfer. For bidirectional power transfer, switches may be used in place of the diodes.

The neutral-point-clamped inverter circuit can also include a second stage including one or more switch legs, each switch leg comprising a corresponding pair of switches having an electrical midpoint between the switches of the pair of switches. The switch legs have a corresponding electrical midpoint, which is utilized for interconnection with an inductor network.

The inductor network can include cross-coupled inductors, coupled inductors provided using limbed inductors, and/or a parallel set of filter inductors, according to three different variations.

For the coupled inductor network variations, the inductor network can include parallel inductor legs, each parallel inductor leg coupled to a corresponding electrical midpoint of a corresponding switch leg and also coupled to an output electrical node coupled to the grid network. The grid network can be an AC network that can include a plurality of phases, and each phase has a corresponding output electrical node being coupled to a corresponding neutral-point-clamped inverter circuit and a corresponding coupled inductor network.

In a first example, the neutral-point-clamped inverter circuit can include two switch legs per phase of the plurality of phases. In this example, the device operates with at least one of the characteristics selected from the group consisting of: a line voltage PWM frequency is $4\times f_c$, a number of line voltage steps is $v_{dc}/4$, a number of line voltage steps is 9, or a common mode voltage is $+/-v_{dc}/8$.

In a second example, the neutral-point-clamped inverter circuit includes three switch legs per phase of the plurality of phases. In this example, the device operates with at least one of the characteristics selected from the group consisting of: a line voltage PWM frequency is $6\times f_c$, a number of line voltage steps is $v_{dc}/6$, a number of line voltage steps is 13, or a common mode voltage is $+/-v_{dc}/12$.

In an embodiment, the grid-connected converter is adapted to be coupled to a plurality of electric vehicles, providing a DC bus voltage for the plurality of electric vehicles to each receive a corresponding energy storage medium charge.

Electric vehicles with onboard DC/DC converter would be capable of connecting to the DC bus voltage provided by the grid-connected converter, and may potentially aid by reducing the charging infrastructure hardware required.

In an embodiment, the DC bus voltage is greater than an operating voltage of the energy storage medium of each electric vehicle of the plurality of electric vehicles.

The grid-connected converter would provide a DC bus voltage to which multiple DC/DC converters would be connected. The DC/DC converters would be used to charge electric vehicles despite the DC bus voltage being greater than the operating voltage of the energy storage medium of each electric vehicle. In some embodiments, the DC/DC converter could be a variant of the NPC-CII.

In an embodiment, the plurality of electric vehicles are charged simultaneously from the DC grid power source. The grid-connected converter provides power simultaneously to each electric vehicle provided that a DC/DC converter is used to interface it to the electric vehicle.

In an embodiment, the plurality of electric vehicles are charged simultaneously from the DC grid power source. The grid-connected converter provides power simultaneously to each electric vehicle, provided that an onboard DC/DC converter is used to interface the vehicle to the electric vehicle.

Corresponding charging or power electronics methods are contemplated, along with gating control sequencing and corresponding machine interpretable instruction sets that are executable on a processing or controller circuit chip. In particular, the machine interpretable instruction sets may be provided as software or firmware products, stored on physical non-transitory machine-interpretable storage media.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Prior approaches to converter technology, while being simple and low cost, have challenges when operating at higher voltage, for example, due to voltage stress on switches for a given bus voltage. Prior approaches to converters can also introduce a common mode voltage between the grid ground, or neutral point, and the DC bus at the converter output. This common-mode voltage can produce system noise at the very least, but also large high-frequency common-mode currents. Therefore, improvements are desired.

Proposed circuit topologies are described in various embodiments that are adapted to address various problems associated with common-mode voltages and/or currents, among others. A number of variations are proposed in respect of different approaches for coupled inductor topologies, for example.

The circuit topologies can be utilized, as a non-limiting example, to charging technology, such as EV technology, to optimize and reduce the need for various electrical components, such as on-board chargers in some cases, reducing overall system complexity, lowering weight, cost, and/or volume, which aids in improving potential adoption of green technologies. The circuit topologies can be controlled to reduce common-mode voltage.

Figure 1B:
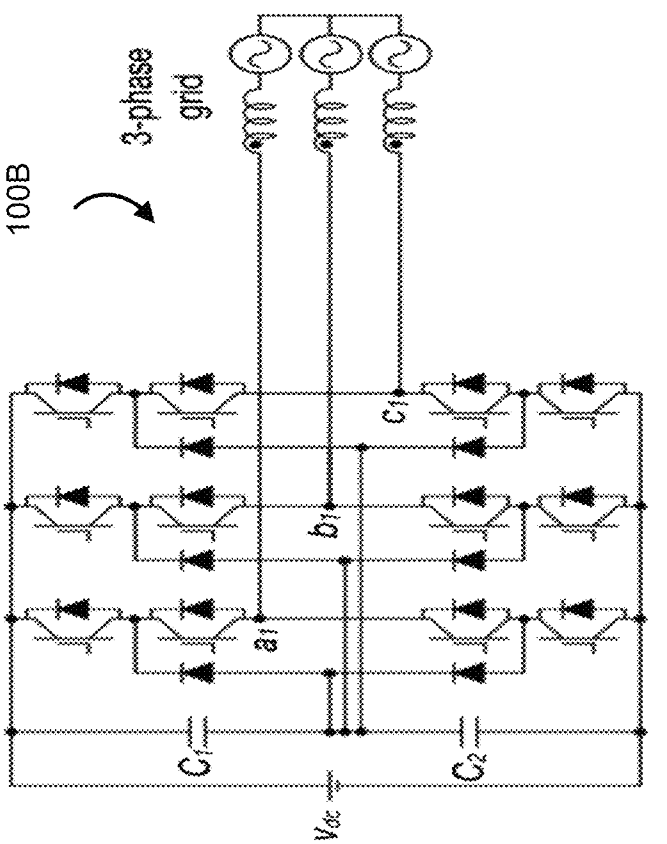
PRIOR ART FIG. 1B
FIG. 1A, FIG. 1B, and FIG. 1C are circuit diagrams of grid rectifiers.
Figure 1A:
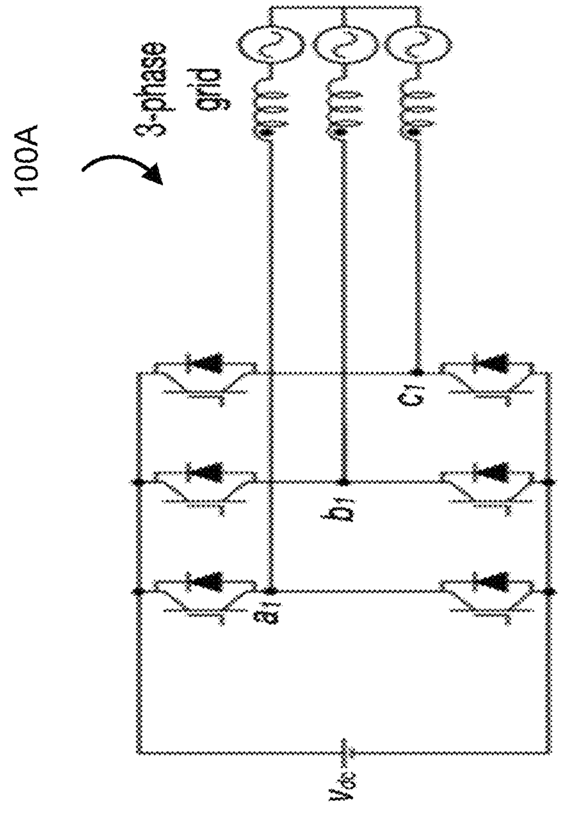
PRIOR ART FIG. 1A
Figure 1C:
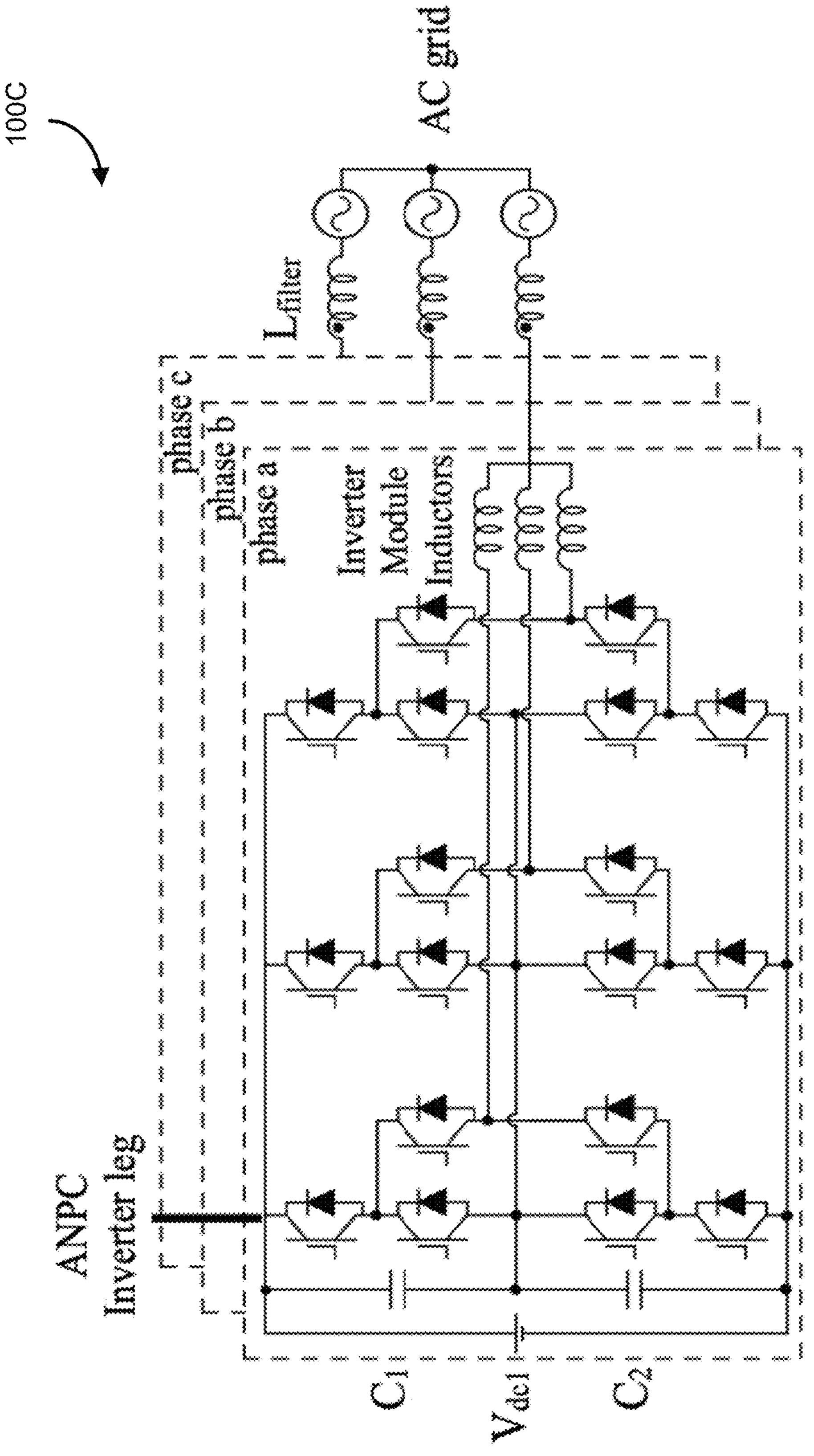
PRIOR ART FIG. 1C

FIG. 1A, FIG. 1B, and FIG. 1C are circuit diagrams of example grid rectifiers 100A, 100B, and 100C. The circuit shown in FIG. 1A is a standard 6 switch three phase converter 100A. Rectifier 100C is a 3-parallel 3-level ANPC.

100A is the favored converter in many 3-phase systems due to its simplicity and low cost. The advent of SiC MOSFET technology is making converter type 100A more attractive at higher voltages. As the system power level increases, the 12-switch 3-level Neutral Point Clamp (NPC) converter 100B is favored as it reduces the voltage stress on the switches for a given DC bus voltage.

Especially in cases where the DC bus voltage is low for the power electronics being required, for example, inverter legs can be connected in parallel to increase the current reading of the converter. An Active Neutral Point Clamped Circuit (ANPC) that has bi-directional power capability, may connect the 3-level inverter legs in parallel using separate inductors connected in series with each inverter, as shown in FIG. 1C. Approaches presented within for an improved equivalent circuit to 100C may, in some embodiments, reduce the switch count per phase from 18 down to 10, and may reduce to as low as 6 for a uni-directional power flow system.

The quality of the grid current may be determined by the nature of the voltage produced by utility grid converters, more specifically, by the number of voltage steps, the size of the line voltage steps, and also the frequency of the pulse-width modulation (PWM) voltage waveforms produced. The switch-mode nature of the converters also introduces a common mode voltage between the grid ground, or neutral point, and the DC bus at the converter output. This voltage can produce system noise at the very least, but also large high frequency common-mode currents due to current return paths to ground and natural systems capacitance, which in turn can also have multiple loops capable of ringing. Performance for two converters are given in Table 1 below (equivalent voltage leads are not available for the parallel 3-level ANPC as it has a current source output due to its use of filter inductors in series with each inverter leg):

TABLE 1

Standard Converter Bridges

| | 2-level 6-switch 100A | 3-level 12-switch NPC 100B |
|---|---|---|
| Line voltage PWM frequency | $2 \times f_c$ | $2 \times f_c$ |
| Line voltage steps | $V_{dc}$ | $\frac{V_{dc}}{2}$ |
| Number of line voltage steps | 3 | 5 |
| Common Mode Voltage | $\pm\frac{V_{dc}}{2}$ | $\pm\frac{V_{dc}}{4}$ |

Presented herein, are systems, methods, and devices which may be relevant to PWM utility grid rectifiers for example, and in some embodiments, for consideration as a grid interphase, which can be used, for example, for 3-phase Electric Vehicles (EVs) Rapid Chargers, among others (e.g., DC, other numbers of phases). The described systems, methods, and devices may be considered useful as part of a DC grid power source, for instance, whereby a number of electric vehicles receive DC power for charging their batteries. In some embodiments, the described systems, methods, and devices may be converters or make use thereof.

Since certain kinds of EVs may receive both 1-phase or 3-phase AC grid supplies, the presented converters may, in some embodiments, be also considered as on vehicle rapid chargers. According to some embodiments, the coupled inductor technology being used may provide that the inductive elements are very small in size. 3-phase implementations are presented, but the described systems, methods, and devices can equally well be adapted, in some embodiments, for single phase power sources or where a battery charger is connected to either a single or a three phase AC power source, for example.

The voltage associated with batteries in EVs is often small for the DC voltage being used, e.g., 400 V and 800 V (battery voltage of EVs). The DC bus voltage, in contrast, can be about 1000 V as a non-limiting illustrative example. For example, a situation of interest is where a site provides a DC bus voltage for several vehicles to receive their battery charge. In such a situation, many hundreds of amps are required to be supplied on the DC bus. This necessitates multiple grid interface power converters to be connected in parallel in order to meet the current demand.

The systems, methods, and devices presented may, according to some embodiments, make use of coupled inductor technology for example, to provide that:

(a) Power may be drawn from the grid with a high power quality using multi-level voltages with step sizes smaller than the DC bus voltage.

(b) Multi-level voltages with high PWM frequencies, higher than the converter switching frequency, can allow the grid input filters to be made smaller in size and weight as well as making for a faster transient response.

(c) The inductor magnetics may have no flux at the low grid frequency, e.g., 60 Hz, and may only have high frequency components, e.g., 20 kHz, related to the converter switching frequencies. This may allow the inductor magnetics to be drastically reduced in size as compared with standard AC filter inductors, for instance.

(d) The smaller line voltage step sizes may reduce the voltage stresses on the input filters, feeder transformer, and may reduce many cable interaction issues.

(e) The common mode voltage between the grid ground and the DC bus may be reduced, in some cases vastly reduced, and so reduces ground noise and high frequency currents associated with none isolated grid interface converters.

(f) The technology presented may, in some embodiments, take advantage of reduced device voltage stresses as experienced in the NPC converter while providing very high current capabilities using parallel connected modules.

Coupled Inductor Variations

Use of coupled inductors may provide that the current associated with the system power flow, AC or DC, does not produce flux in the magnetic core. This may result from using two windings on one core, or one limb, where the currents in each winding are the same but cancel each other in terms of producing flux in the core.

In typical AC systems, such as utility grid and motor drive currents, the load current consists of an AC fundamental current with a much smaller high frequency current ripple associated with the switching frequency of the power electronic converters.

For example, if the peak of the power AC current is 100 A, and the peak of the high frequency ac current ripple is 1 A, then the flux produced in coupled inductors is a result of the high frequency current ripple and 100 times smaller than a typical AC filter inductor where the fundamental current does produce flux in the core. If the peak inductor flux is said to be reduced by 100 times in a coupled inductor circuit, then the cross sectional area of the magnetic core can be reduced by a factor of 100. This assumes that the core has the same peak flux density, or saturation flux density, and the core is designed assuming a magnetic peak flux density to be one half the core saturation flux density.

Note that the magnetic core size can be dependent on the two main factors, (a) peak magnetic flux density, (b) temperature rise due to core and copper losses. When using magnetic material such as metglas, for example, the limiting factor on core size is often the peak flux density rather than its losses and associated temperature rise.

Parallel Converters Using Coupled Inductors

A benefit, in some embodiments, of having the magnetics' size being determined by the switching frequency of the converters, hence peak core flux density, is that the magnetics' size can then be complemented by the improvement in the electrical characteristics obtained by using multi-winding coupled inductors connecting the outputs of parallel connected inverter legs. Parallel systems connected using different kinds of inductors may be used in some embodiments, to produce a higher rated current.

If this connection is implemented using coupled inductors, as in some embodiments, together with using interleaved PWM switching techniques and phase shifted carriers, multi-level PWM voltages can be produced. Control methods are described, according to some embodiments, in greater detail below.

The resultant quality of the output voltage may be improved as the number of voltage levels are increased and voltage waveshape approaches that of the desired shape (e.g., DC or sine wave). The PWM frequency in the multi-level voltage may also be higher than the converter switching frequency.

As the number of parallel inverter legs are increased then, according to some embodiments:

(a) The number of levels in the AC output voltage may increase and the voltage become more similar to a desired shape (e.g., more DC or sine wave in shape). This may lower the harmonic content of the fundamental AC voltage being created.

(b) The steps in the multi-level voltages may decrease, and may be lower than the DC supply voltage. This may lower the voltage stress on cables, loads, motors and electrical filters (e.g., allowing the use of lower voltage rated components to reduce cost or other engineering decision factors).

(c) The current rating of the converter system may increase.

(d) The frequency of the line voltage PWM waveforms, assuming 3-phase AC systems, may be made higher than the converter switching frequency. This may lower the output high frequency current ripple, and importantly this may allow smaller filters to be used (the increase in the number of voltage steps may add to this benefit).

(e) In some embodiments, when a coupled inductor is used with an AC filter inductor, the combined inductor size can be reduced to smaller than using only standard filter inductors alone.

(f) As a direct result of smaller voltage steps in the output voltage waveform, the common mode voltage between the AC supply ground and the DC output may be reduced. This can help to alleviate common mode ground noise, high frequency circulating currents, and currents oscillating between multiple loads connected to the same DC bus. Even if no direct path to the system ground exists, common mode voltages between the AC supply and the DC side can cause currents to flow because of parasitic capacitive coupling between various components, in some embodiments.

The presented systems, methods, and devices, and the described embodiments may be for use as utility grid rectifiers where the DC voltage is restricted. For example, battery loads tend to have this limitation, but high currents are required for rapid charging. This lends the rectifier design to using parallel connected converters to permit the flow of higher currents, in some embodiments.

Figure 2B:
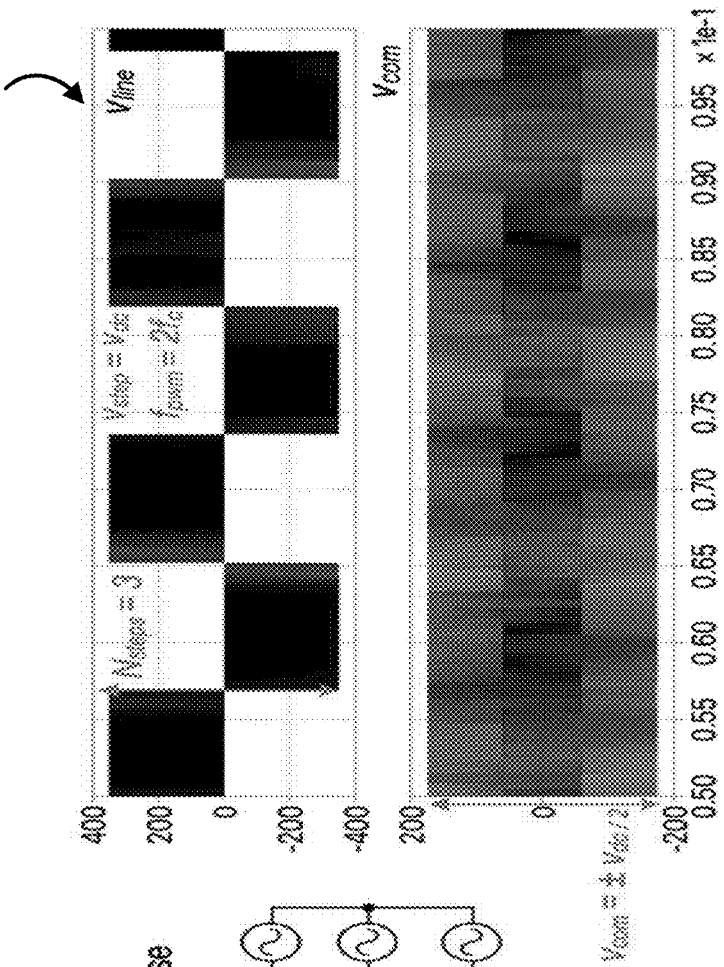
PRIOR ART FIG. 2B
FIG. 2B is a graph showing common mode and line voltage of the circuit shown in FIG. 2A.
Figure 2A:
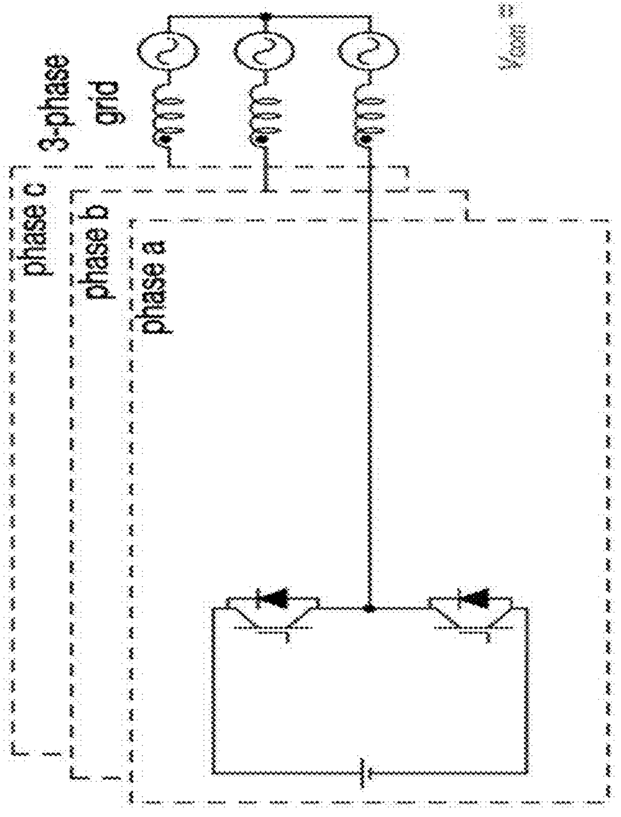
PRIOR ART FIG. 2A
FIG. 2A is a per-phase topology circuit diagram of a 2-level 6 switch rectifier.

FIG. 2A is a per-phase topology circuit diagram of a 2-level 6 switch rectifier.

FIG. 2B is a graph showing common mode and line voltage of the circuit shown in FIG. 2A.

The 2-level 6 switch rectifier, shown in 200A, is a popular choice especially with the introduction of SiC MOSFET devices. These devices can cope with the voltages required in battery chargers, e.g., 10 kV devices are available, but the high current demands for feeding a DC bus also requires parallel modules to be considered.

Some of the problems associated with the low number of steps and step size in the line voltage, 3 and $V_{dc}$ respectively, can be partially compensated by operating the devices at high switching frequencies. Large voltage steps and large common mode voltage, and the frequency of the PWM output is lower, so it is harder to filter (e.g., needs to have larger filter inductors, or have very high ripple current, which is undesirable). Ripple current can create noise, EMI emissions, or introduce electrical losses (e.g., power losses) in the system.

Compensation can help to alleviate grid filter design problems. However, the PWM frequency is only twice the converter switching frequency, and the converter produces large steps in both the line voltage and the common mode voltage: $V_{dc}$ and $\pm V_{dc}/2$ respectively, as shown in 200B.

Figure 3A:
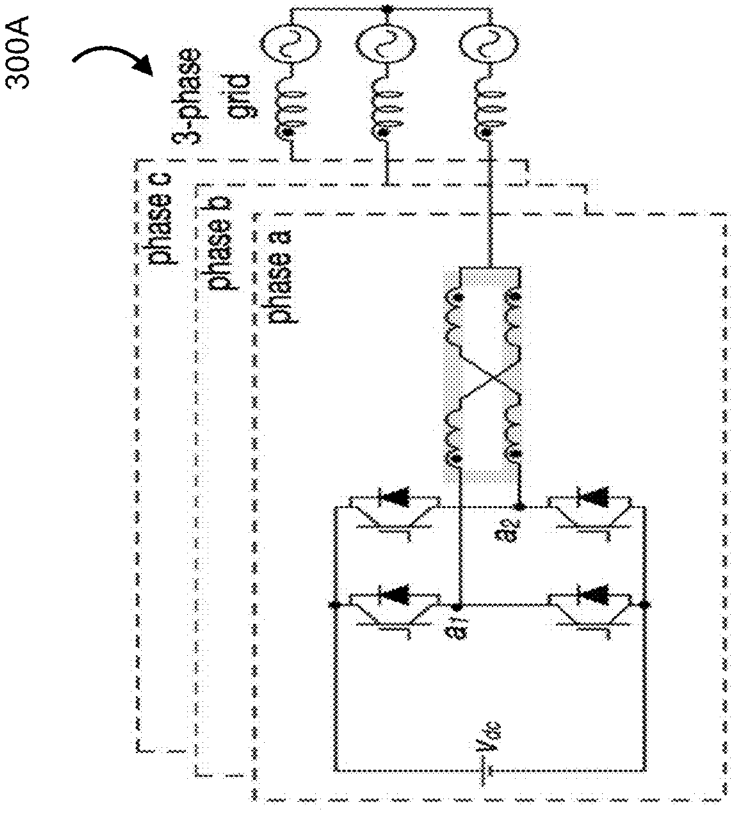
PRIOR ART FIG. 3A
FIG. 3A is a per-phase topology circuit diagram of a CII 2 legs per phase bi-directional rectifier.
Figure 3B:
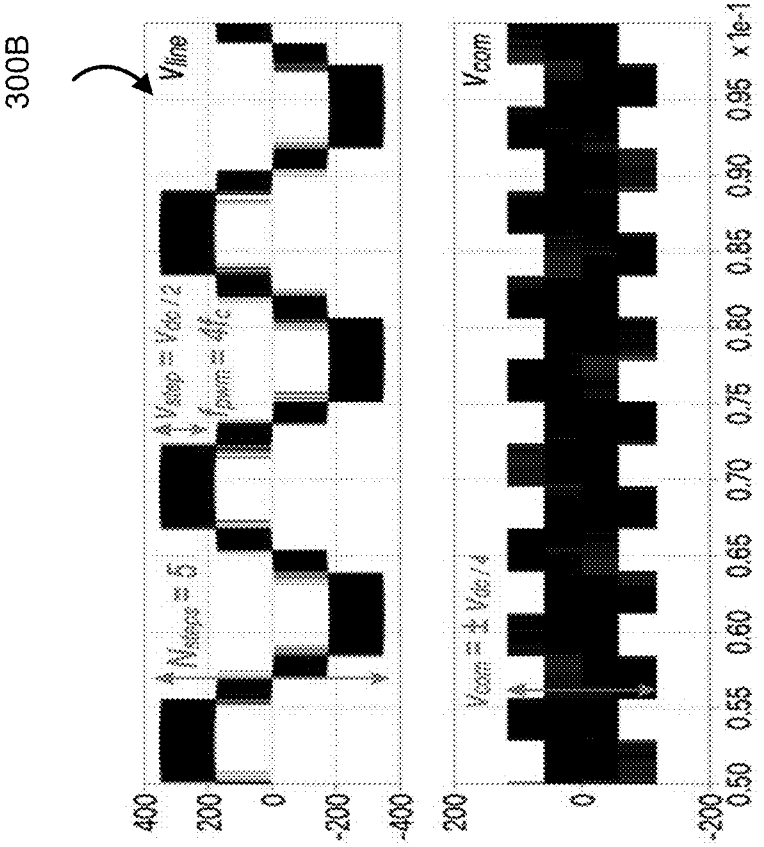
PRIOR ART FIG. 3B
FIG. 3B is a graph showing common mode and line voltage of the circuit shown in FIG. 3A.

FIG. 3A is a per-phase topology circuit diagram of a CII 2 legs per phase bi-directional rectifier. FIG. 3B is a graph showing common mode and line voltage of the circuit shown in FIG. 3A.

Figure 4A:
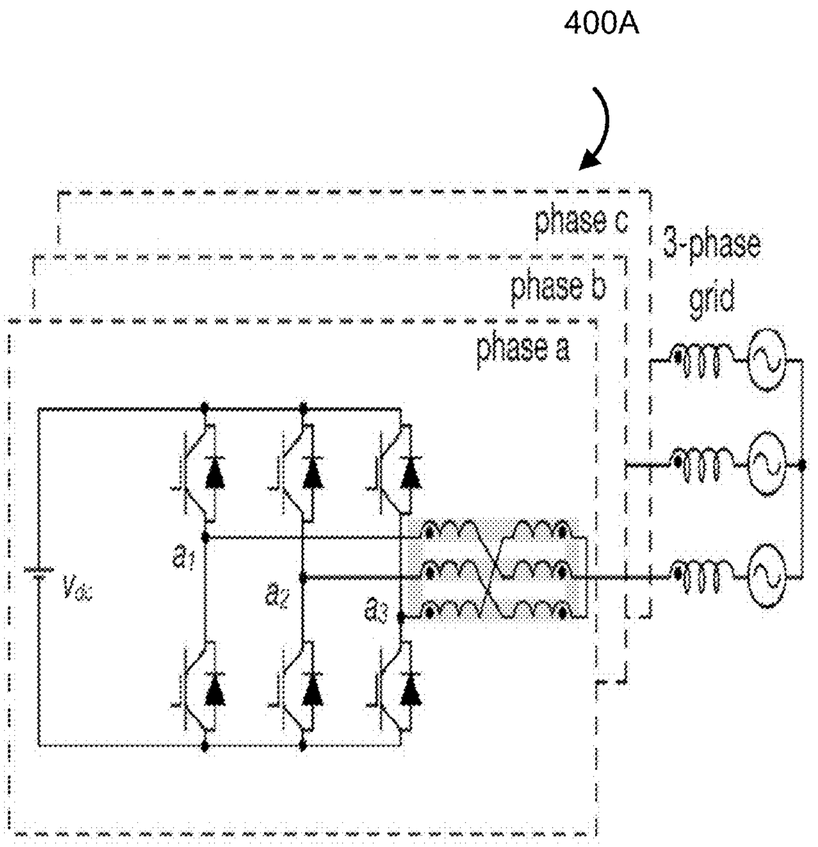
PRIOR ART FIG. 4A
FIG. 4A is a per-phase topology circuit diagram of a CII 3 legs per phase bi-directional rectifier.
Figure 4B:
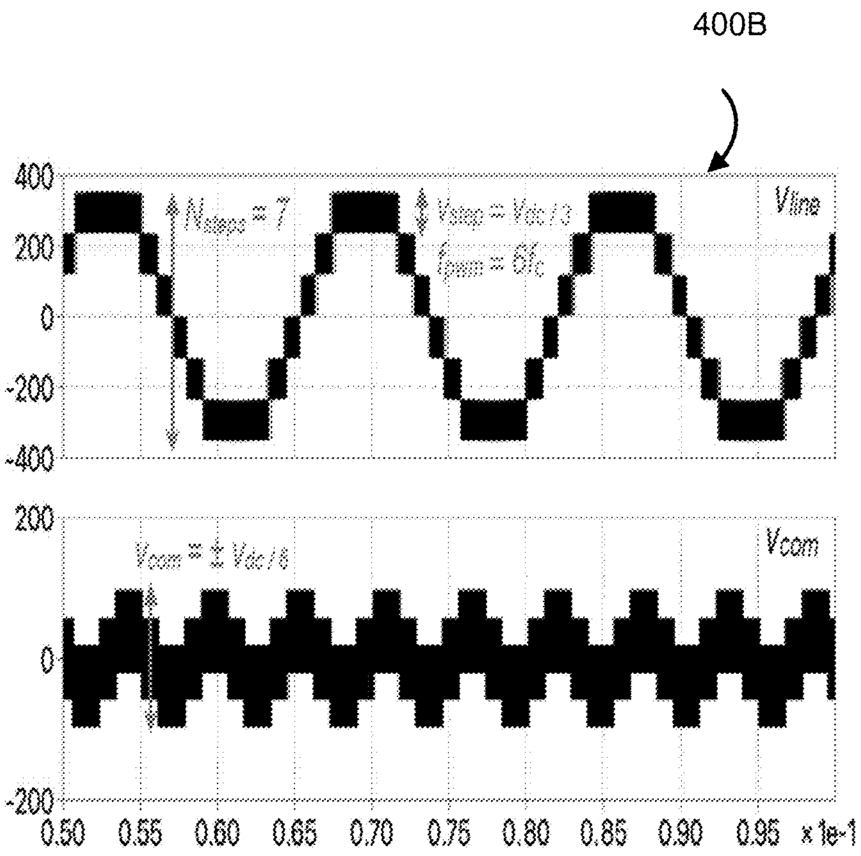
PRIOR ART FIG. 4B
FIG. 4B is a graph showing common mode and line voltage of the circuit shown in FIG. 4A.

FIG. 4A is a per-phase topology circuit diagram of a CII 3 legs per phase bi-directional rectifier. FIG. 4B is a graph showing common mode and line voltage of the circuit shown in FIG. 4A.

The coupled inductor converters, according to some embodiments, shown in 300A and 400A, may increase the number of voltage steps in the line voltage to 5 and 7 respectively, with step sizes of $V_{dc}/2$ and $V_{dc}/3$, and with a PWM frequency 4 and 6 times greater than the converter switching frequency.

These characteristics may be obtained using small coupled inductor sizes, and reduce AC filter inductor size. Also significantly, the common voltage between the grid ground and the out DC bus may be reduced to $\pm V_{dc}/4$ and $V_{dc}/6$, as shown in 300B and 400B, respectively. This voltage also has a higher frequency component which can be more easily filtered using common mode filter chokes. These topologies can also allow bi-directional power flow.

Table 2 provides a performance summary of several rectifiers as described in variations in this description, as shown in different figures. In particular, it is important to note that for 1000A and 700A, there is a significant increase in the number of line voltage steps and also a corresponding decrease in the common mode voltage, which is desirable.

TABLE 2

Comparison of voltage parameters

| | 2-level inverter 100A | 3-level NPC 100B | CII 2 legs/phase 300A | CII 3 legs/phase 400A | NPC CII 2 legs/phase 1000A | NPC CII 3 legs/phase 700A |
|---|---|---|---|---|---|---|
| Line voltage PWM frequency | $2 \times f_c$ | $2 \times f_c$ | $4 \times f_c$ | $6 \times f_c$ | $4 \times f_c$ | $6 \times f_c$ |
| Line voltage steps | $V_{dc}$ | $\frac{V_{dc}}{2}$ | $\frac{V_{dc}}{2}$ | $\frac{V_{dc}}{3}$ | $\frac{V_{dc}}{4}$ | $\frac{V_{dc}}{6}$ |
| Number of line voltage steps | 3 | 5 | 5 | 7 | 9 | 13 |
| | 2-level inverter 100A | 3-level NPC 100B | CII 2 legs/phase 300A | CII 3 legs/phase 400A | NPC CII 2 legs/phase 1000A | NPC CII 3 legs/phase 700A |
| Common Mode Voltage | $\pm\frac{V_{dc}}{2}$ | $\pm\frac{V_{dc}}{4}$ | $\pm\frac{V_{dc}}{4}$ | $\pm\frac{V_{dc}}{6}$ | $\pm\frac{V_{dc}}{8}$ | $\pm\frac{V_{dc}}{12}$ |

Figure 5A:
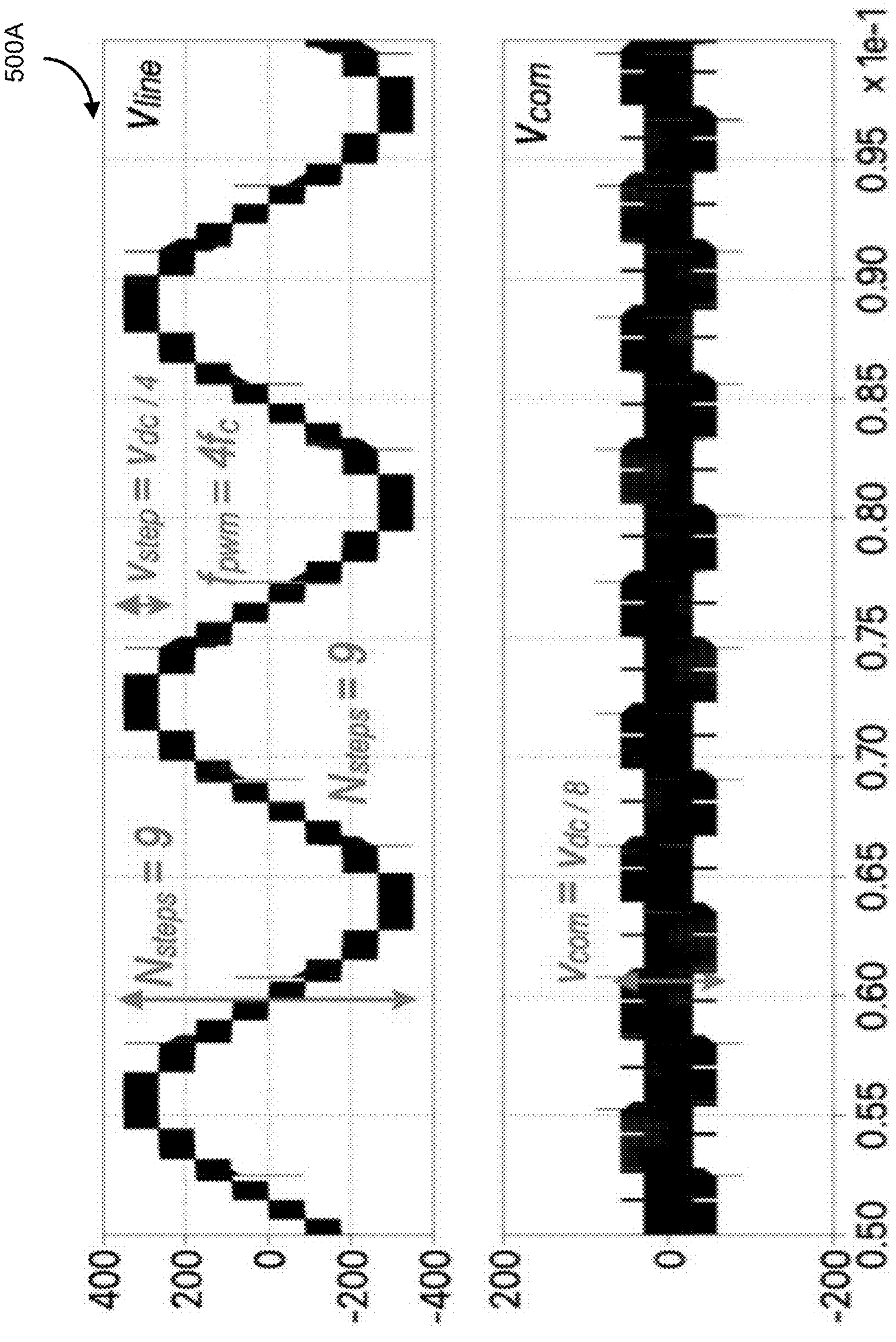
FIG. 5A is a graph showing common mode and line voltage of the circuit shown in FIG. 10A, according to some embodiments.
Figure 5B:
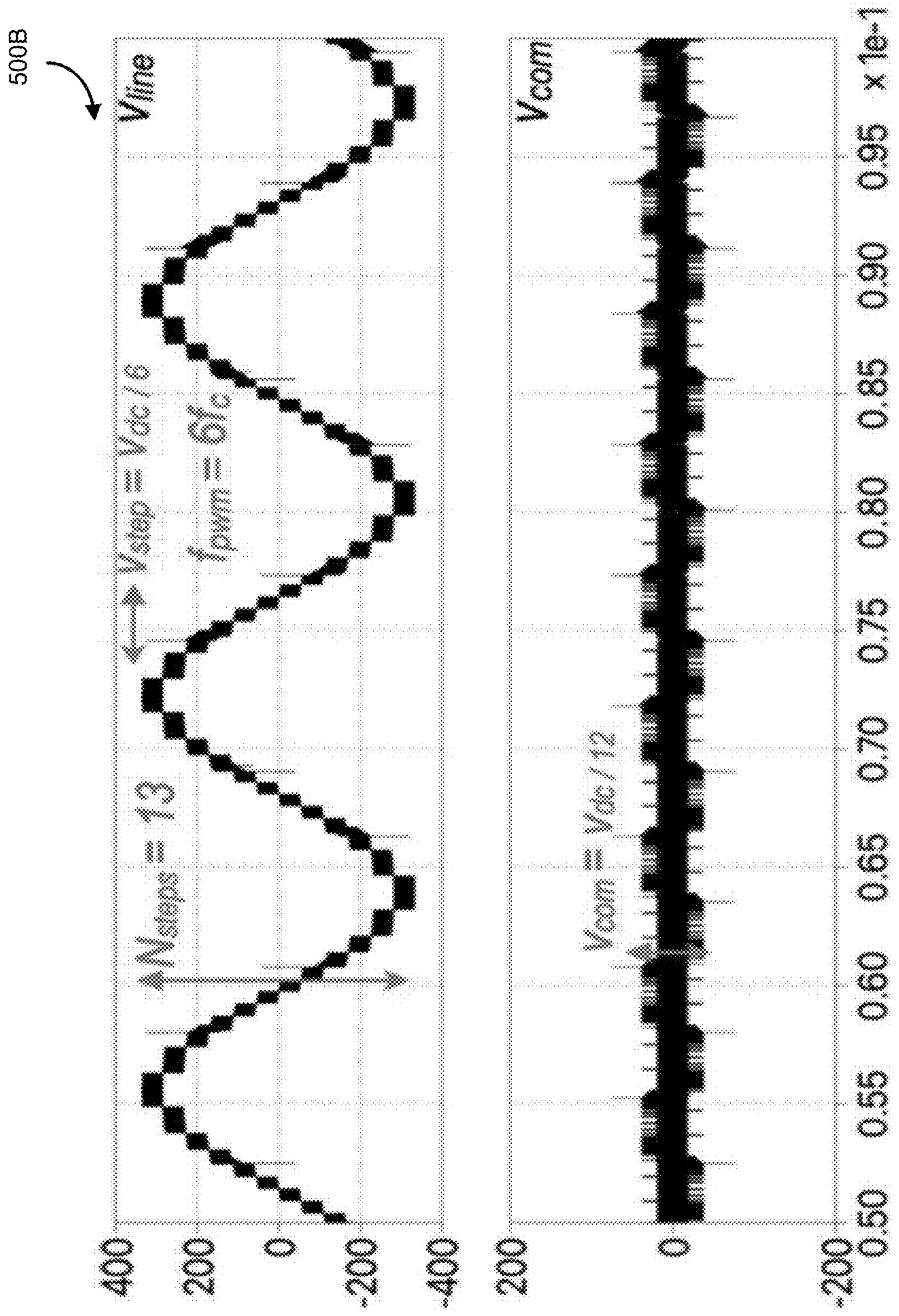
FIG. 5B is a graph showing common mode and line voltage of the circuit shown in FIG. 7A, according to some embodiments.
Figure 7A:
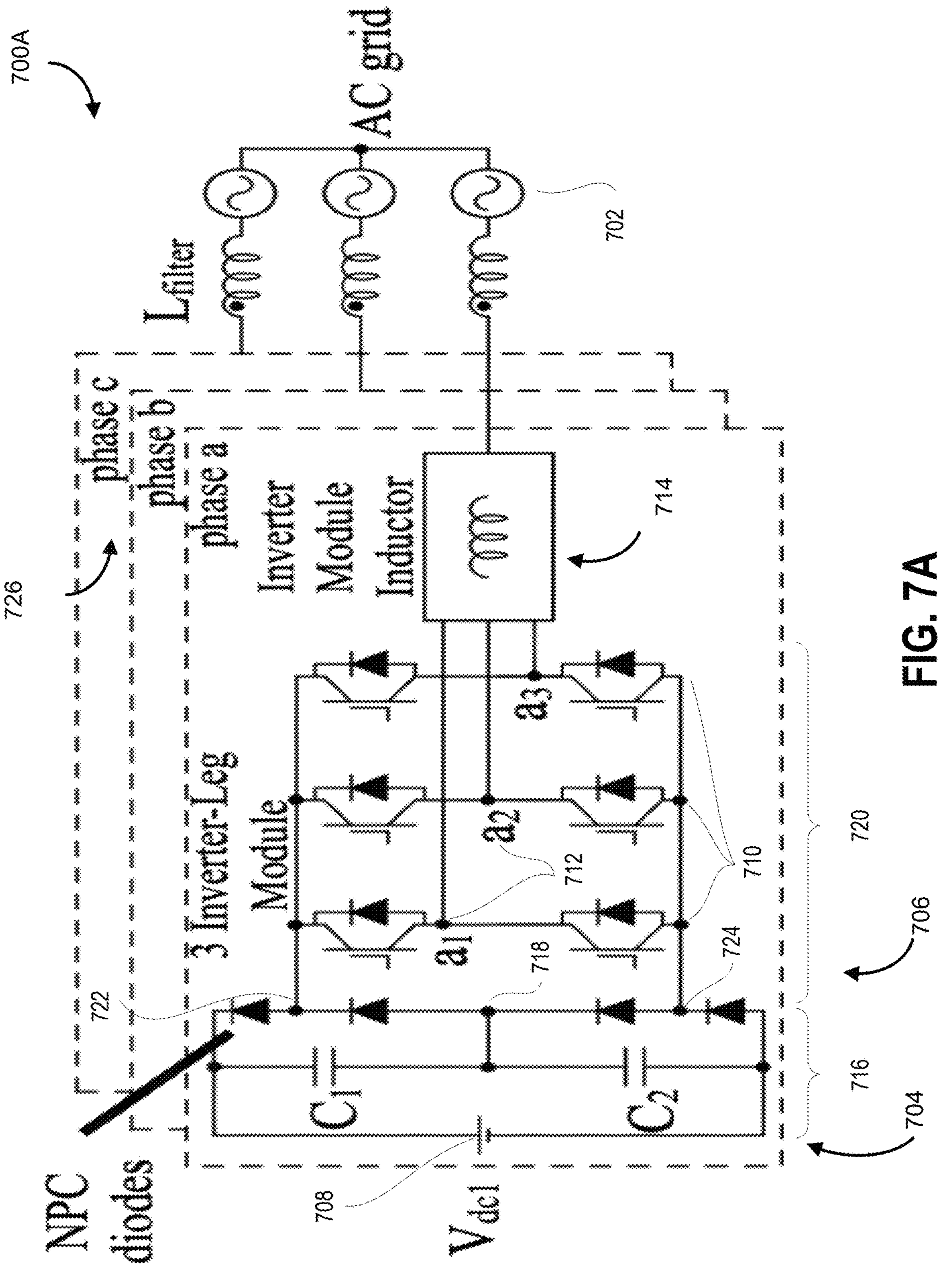
FIG. 7A is a per-phase topology circuit diagram of an NPC CII 3 legs per phase uni-directional rectifier, according to some embodiments.
Figure 10A:
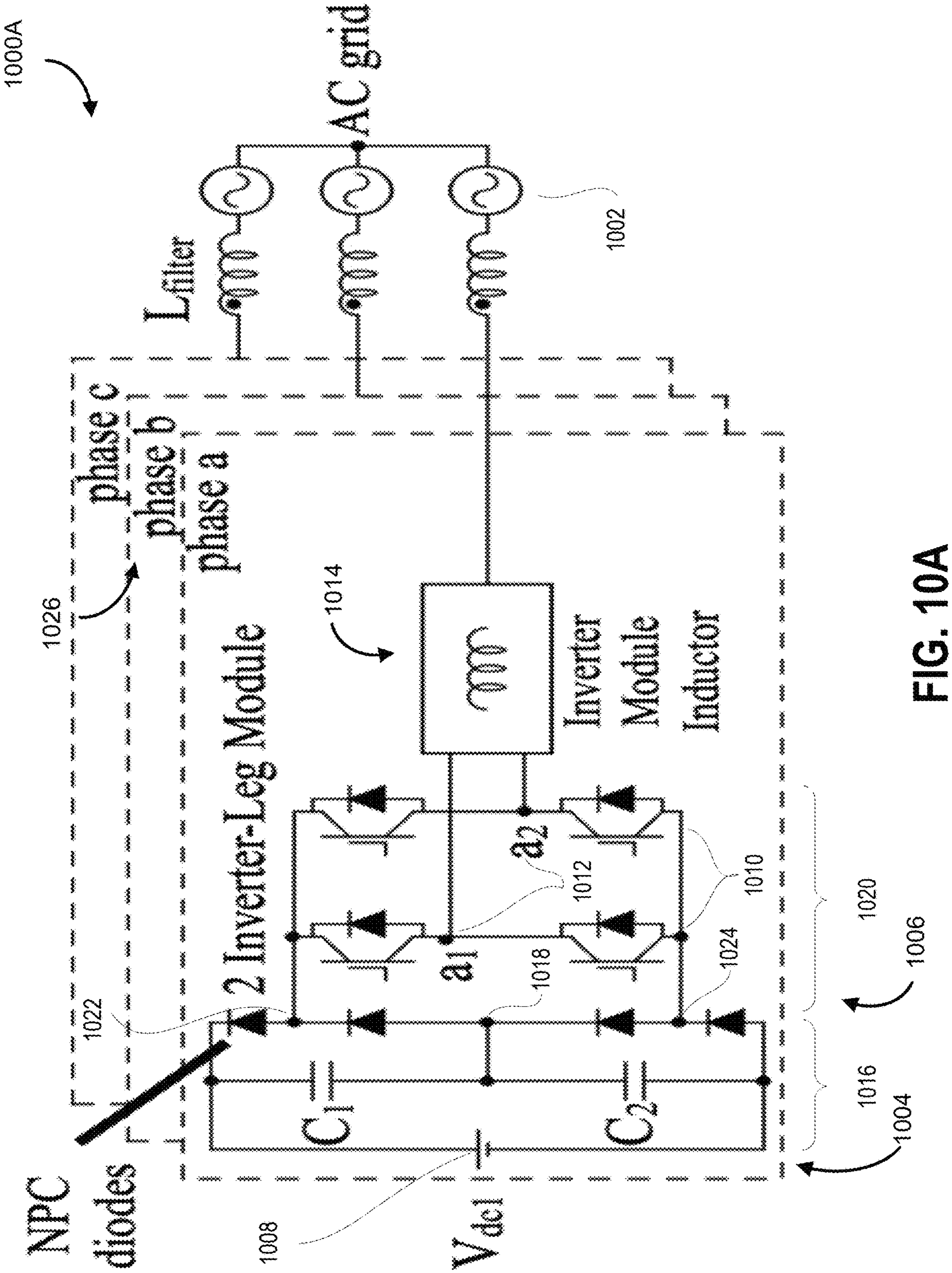
FIG. 10A is a per-phase topology circuit diagram of an NPC CII 2 legs per phase uni-directional rectifier, according to some embodiments.

FIG. 10A is a per-phase topology circuit diagram of an NPC CII 2 legs per phase uni-directional rectifier, according to some embodiments. FIG. 5A is a graph showing common mode and line voltage of the circuit shown in FIG. 10A, according to some embodiments. FIG. 7A is a per-phase topology circuit diagram of an NPC CII 3 legs per phase uni-directional rectifier, according to some embodiments. FIG. 5B is a graph showing common mode and line voltage of the circuit shown in FIG. 7A, according to some embodiments.

The parallel connected inverters in FIGS. 3 and 4 can be said to have parallel connected inverter modules (or inverter leg) in each phase of a 3-phase system. These modules can be converted to a Neutral-Point-Clamped (NPC) and Active-Neutral Point Clamped (ANPC) type of converter.

For a 3-phase AC system, the numbers of steps in the line voltage may be increased to 9 and 13 (per-phase output voltage may be 5 and 7), with step sizes of $V_{dc}/4$ and $V_{dc}/6$, and with a PWM frequency of 4 and 6 times the converter switching frequency, as shown in FIG. 5A, FIG. 5B and in Table 2. Also significantly for these two rectifiers, the common voltage between the grid ground and the out DC bus is reduced to $\pm V_{dc}/8$ and $V_{dc}/12$, shown in Table 2. This voltage also has a higher frequency component and is more easily filtered using common mode filter chokes.

In an aspect, a grid-connected converter device, such as that shown in 1000A and/or 700A for example, for interfacing a grid network 1002, 702 and coupling the AC network to a direct current (DC) source or DC Bus/Network 1004, 704 is provided. While an alternating current (AC) network is shown in 700A and 1000A, it should be noted that in some embodiments, instead of an AC network, any grid network, such as a DC network for example, can be utilized instead.

According to this aspect, the device includes a neutral-point-clamped inverter circuit 1006, 706 having a voltage $v_{dc}$ 1008, 708, across the direct current (DC) source or DC Bus/Network 1004, 1004, the neutral-point-clamped inverter circuit including one or more switch legs 1010, 710, each switch leg comprising a corresponding pair of switches having an electrical midpoint 1012, 712 between the switches of the pair of switches.

The neutral-point-clamped inverter circuit, if there are multiple phases, can have a same voltage across multiple phase versions of the circuits that are all coupled together.

The device further includes an inductor network 1014, 714 coupled to the neutral-point-clamped inverter circuit 1006, 706. In this example, a coupled inductor network is shown, which further, is depicted as a cross-coupled inductor network. Other variations are possible. The inductor network 1014, 714 includes a set of parallel inductor legs, each parallel inductor leg coupled to a corresponding electrical midpoint 1012, 712 of a corresponding switch leg and also coupled to an output electrical node coupled to the AC network 1002, 702. In some embodiments, it may be coupled to any grid network, such as a DC network, for example.

In an embodiment, the neutral-point-clamped inverter circuit 1006, 706 includes a first stage 1016, 716 having an upper capacitor and a lower capacitor connected across an NPC electrical midpoint 1018, 718, an upper pair of clamping diodes or switches, and a lower pair of clamping diodes or switches, the upper and lower pair of clamping diodes or switches coupled across the NPC electrical midpoint 1018, 718. It should be noted, that 700A and 1000A show a uni-directional embodiment with diodes, however in some embodiments, such as bi-directional converters, switches may be used.

The neutral-point-clamped inverter 1006, 706 further includes a second stage 1020, 720 including the one or more switch legs 1010, 710, each of the switch legs coupled to an electrical midpoint of the upper pair of clamping diodes or switches 1022, 722, and an electrical midpoint of the lower pair of clamping diodes or switches 1024, 724.

In an embodiment, the grid network is an AC network 1002, 702 has a plurality of phases 1026, 726, and each phase has a corresponding output electrical node being coupled to a corresponding neutral-point-clamped inverter circuit, which may be similar in topology to neutral-point-clamped inverter circuit 1006, 706, according to some embodiments, and a corresponding coupled inductor network, which may be similar to coupled inductor network 1014, 714, according to some embodiments. In some embodiments, $v_{dc}$ 1008, 708 is common across the nodes, in a multi-phase approach, for example. In some embodiments, the grid network may be a DC network, rather than an AC network.

In an embodiment, the neutral-point-clamped inverter circuit 1006, 706 includes two switch legs 1010, 710 per phase of the plurality of phases 1026, 726.

In another embodiment, the device 1000A, 700A operates with at least one of the characteristics selected from the group consisting of: a line voltage PWM frequency is $4\times f_c$, a number of line voltage steps is $v_{dc}/4$, a number of line voltage steps is 9, or a common mode voltage is $+/-v_{dc}/8$. This may be seen, for example, in Table 2 above. In some embodiments, the device may operate with more than one of these characteristics, all of these characteristics, or other characteristics.

In an embodiment, the neutral-point-clamped inverter circuit 1006, 706 includes three switch legs 1010, 710 per phase of the plurality of phases 1026, 726.

In an embodiment, the device operates with at least one of the characteristics selected from the group consisting of: a line voltage PWM frequency is $6\times f_c$, a number of line voltage steps is $v_{dc}/6$, a number of line voltage steps is 13, or a common mode voltage is $+/-v_{dc}/12$. This may be seen, for example, in Table 2 above. In some embodiments, the device may operate with more than one of these characteristics, all of these characteristics, or other characteristics.

In an embodiment, the inductor network 1014, 714 is a coupled inductor network having parallel inductor limbs. In another embodiment, the inductor network is a coupled inductor network having cross-coupled inductor limbs. In another embodiment, the inductor network includes parallel filter inductor limbs. In some embodiments, different inductor topologies may be used in the inductor network.

In an embodiment, the grid-connected converter is adapted to be coupled to a plurality of electric vehicles, providing a DC bus voltage for the plurality of electric vehicles to each receive a corresponding energy storage medium charge.

In an embodiment, the DC bus voltage is greater than an operating voltage of the energy storage medium of each electric vehicle of the plurality of electric vehicles.

In an embodiment, the plurality of electric vehicles are charged simultaneously from the DC grid power source 1004, 704.

In an aspect, a method is presented for connecting a grid-converter interfacing a grid network and coupling the grid network to a direct current (DC) source or DC Bus/ Network. The method may include providing an embodiment of the device described above, for example.

In an aspect, a non-transitory, machine readable medium storing machine interpretable instruction sets, which when executed by a processor, cause the processor to perform a method providing a device according to described embodiments.

Figure 7B:
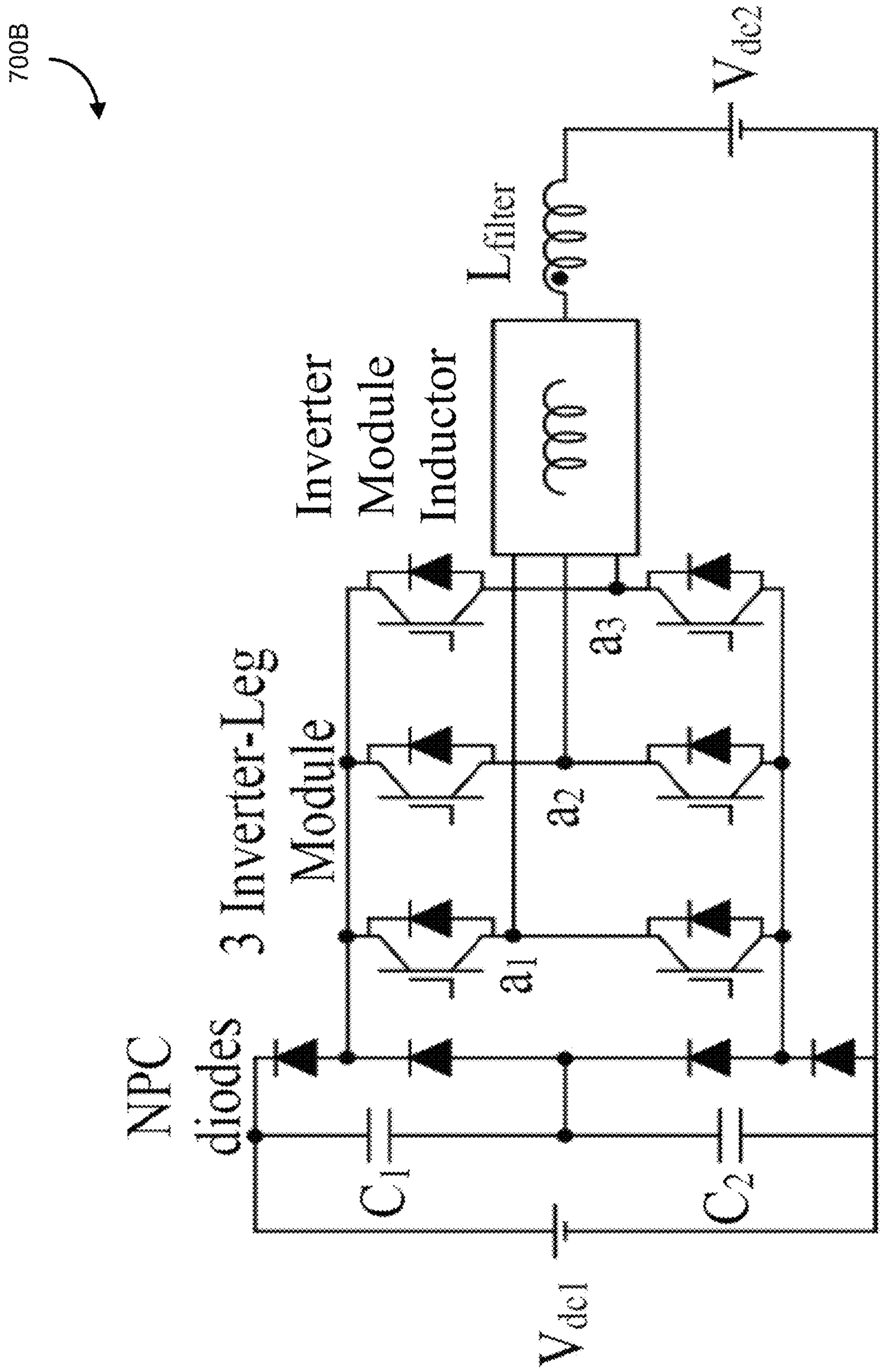
FIG. 7B is a per-phase topology circuit diagram of an NPC CII 3 legs per phase uni-directional DC/DC converter, according to some embodiments.
Figure 8:
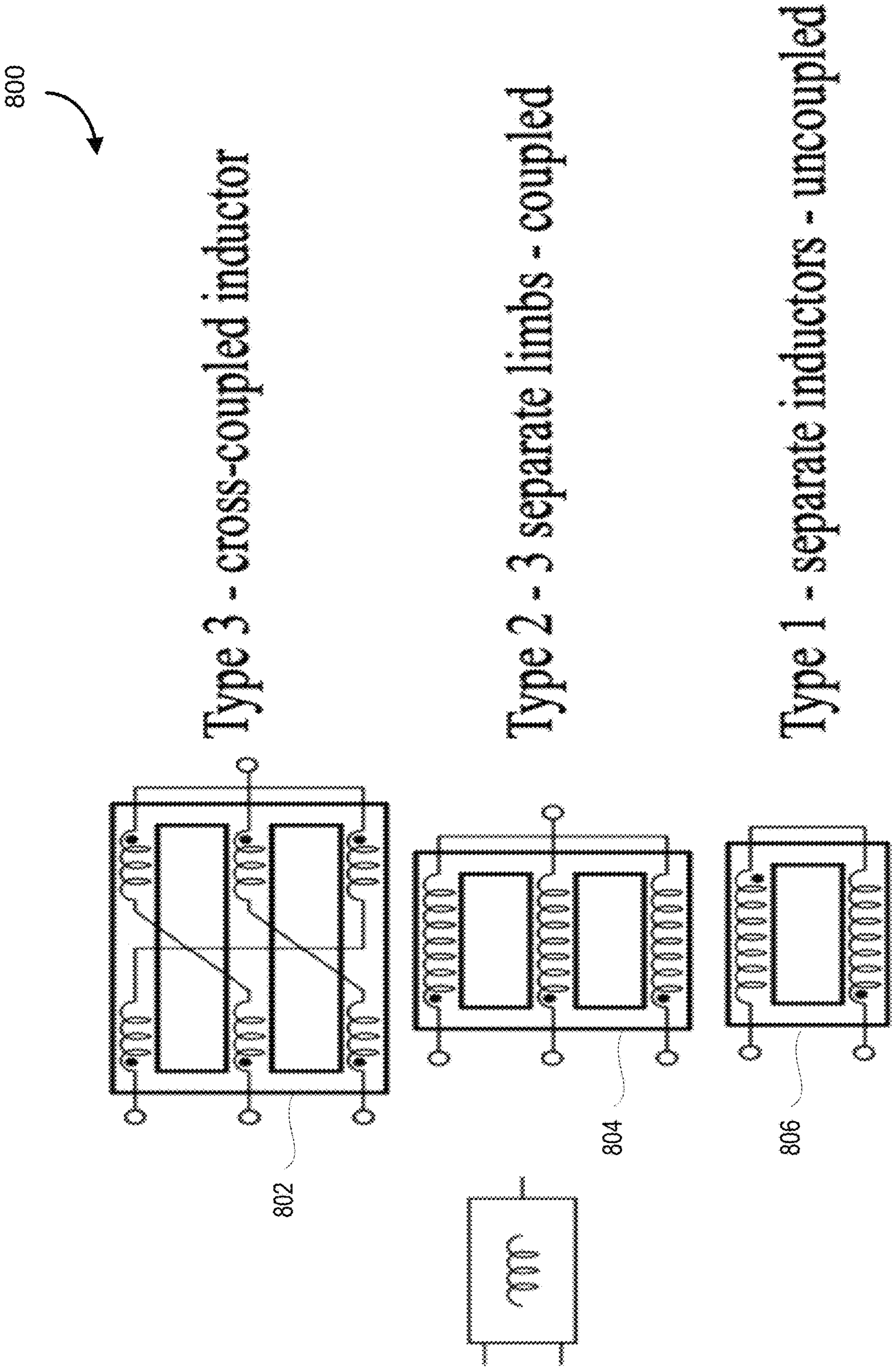
FIG. 8 is a diagram showing 3-inverter leg inductor variations, according to some embodiments.
Figure 10B:
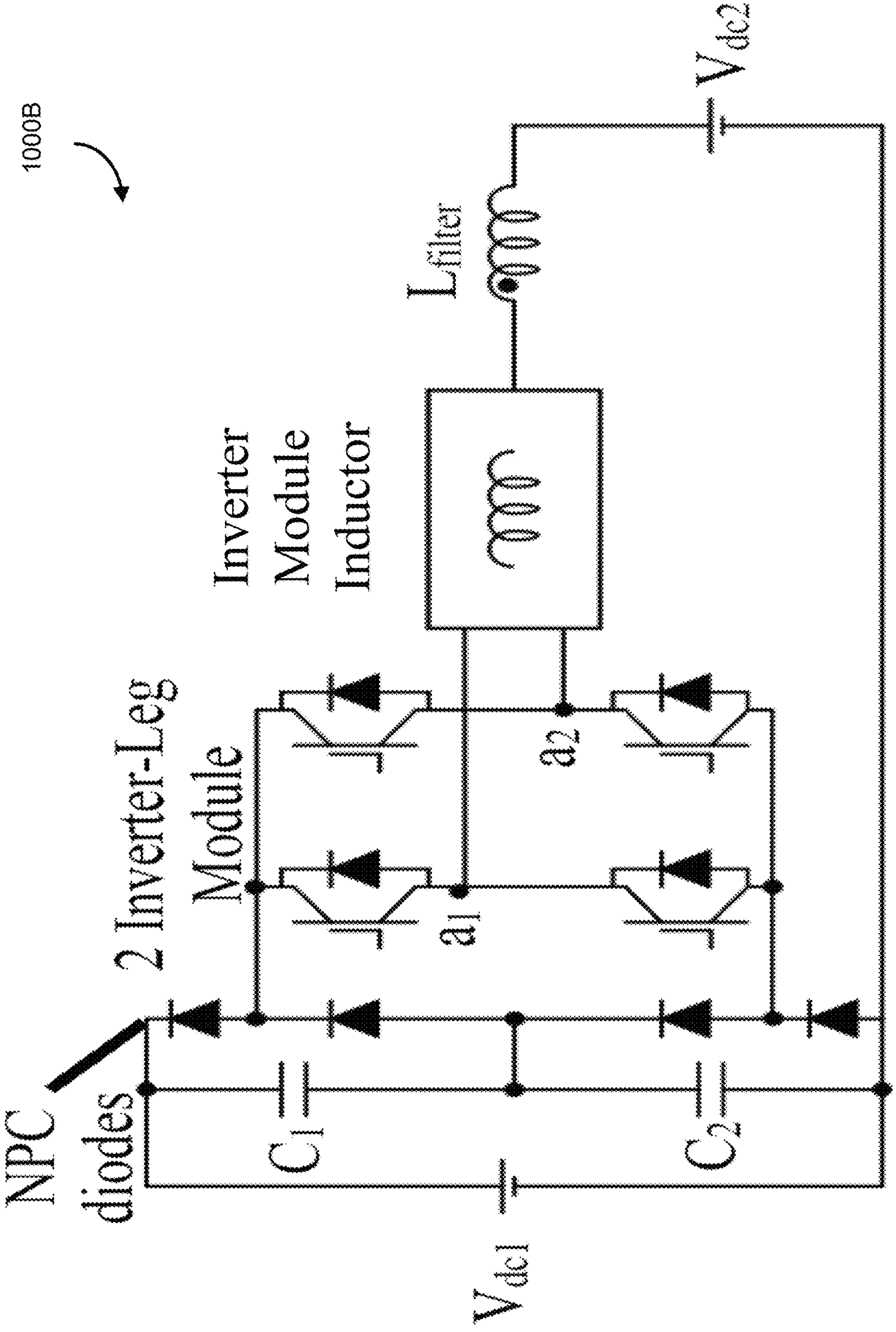
FIG. 10B is a per-phase topology circuit diagram of an NPC CII 2 legs per phase uni-directional DC/DC converter, according to some embodiments.
Figure 11:
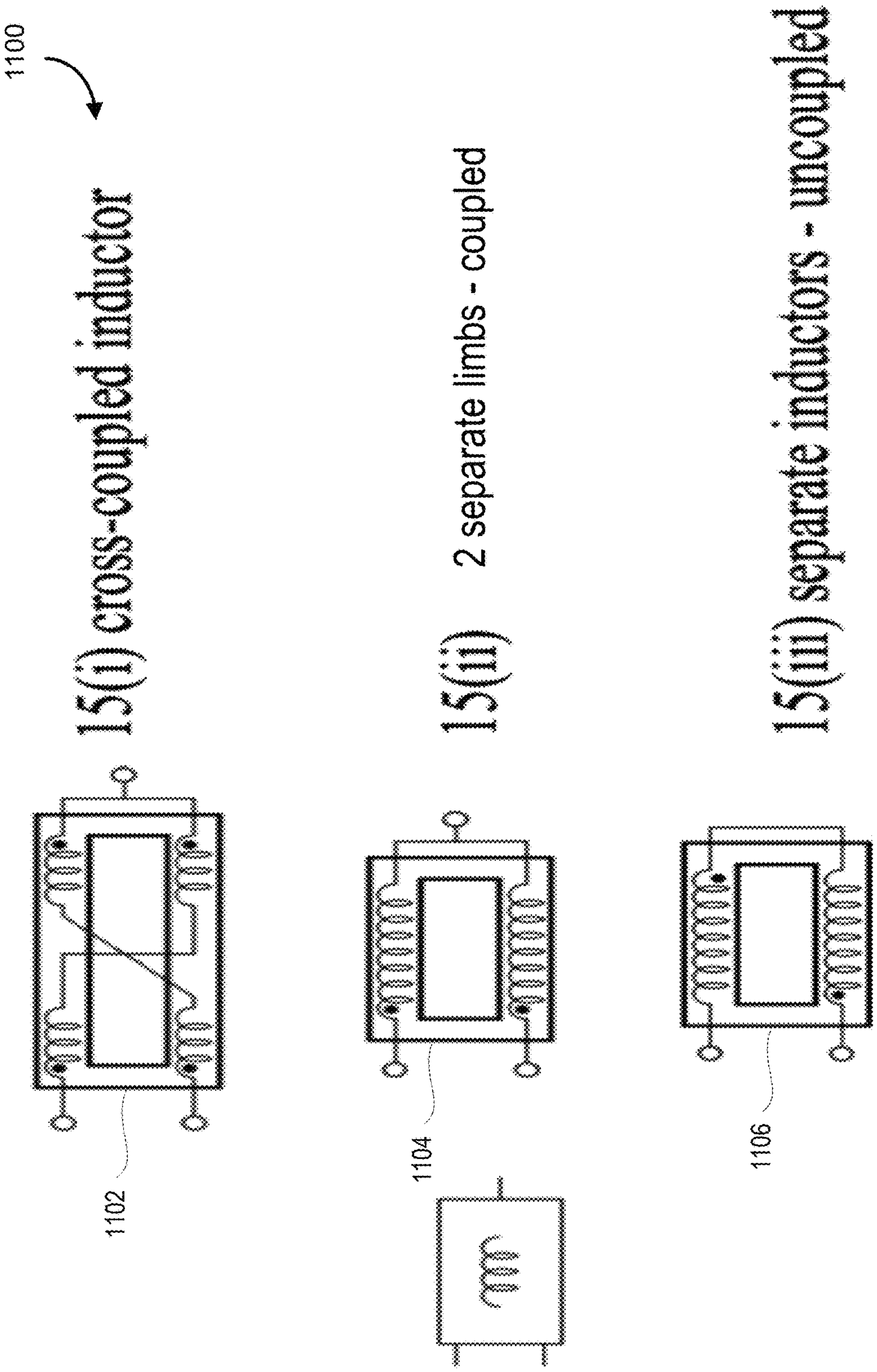
FIG. 11 is a diagram showing 2-inverter leg inductor variations, according to some embodiments.

The inverter modules located in each phase can have any number of parallel connected inverter legs, in some embodiments, shown in FIGS. 6-8 which illustrate modules using 3 parallel connected inverter legs, according to some embodiments. FIG. 8 is a diagram 800 showing 3-inverter leg inductor variations, 802, 804, and 806, according to some embodiments. FIGS. 9-11 illustrate 2 inverter leg modules, according to some embodiments. FIG. 11 is a diagram 1100 showing 2-inverter leg inductor variations, 1102, 1104, and 1106, according to some embodiments.

The number of steps in the output voltage may be increased, and the step sizes decreased, the more inverter leg modules that are used, for example. However there may be diminishing returns as the number of inverter legs are increased above 3. Hence, the circuit topologies illustrated in FIGS. 9-11 are shown using 2 and 3 inverter leg modules. In other embodiments, more than 3 inverter leg modules may be used. The addition of the NPC and ANPC converter stage with the inverter leg modules, in some embodiments, may reduce the voltage stresses on all components by 50%, for example, and makes the technology more viable for higher voltages/power levels.

Unlike existing parallel connected systems, such as that shown in FIG. 1C for example, the inverter leg modules supplying the output inductor stage, in some embodiments, may be added to a single NPC or ANPC stage and so reduces the number of switches and diodes and switches (and associated gate drivers for the latter). For example, in 600A a 3-leg inverter leg module is placed on a single 4-switch ANPC inverter leg, hence using 10 switches per phase. This contrast with the parallel converter in FIG. 1C, that uses three 4-switch ANPC inverter legs with a total of 18 switches per phase. Taking this further, the 3 inverter leg module in shown in FIG. 7A uses only 6 switches per phase by having a uni-directional power flow system. The parallel connected inverter-leg modules may be designed for high switching frequencies and current sharing, whereas the NPC and ANPC stages may be designed for very low switching frequencies and higher current ratings.

Figure 6A:
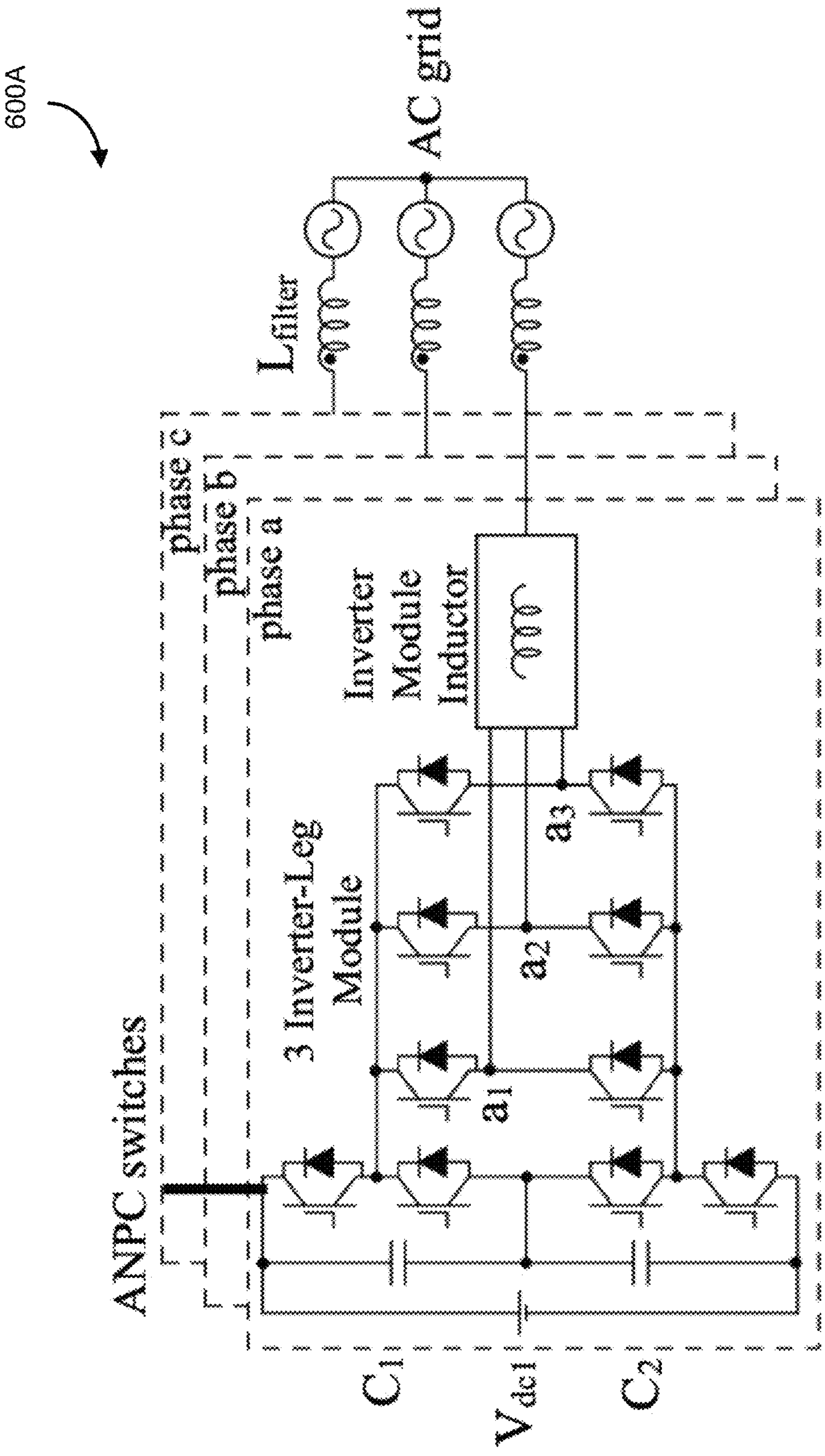
FIG. 6A is a per-phase topology circuit diagram of an NPC CII 3 legs per phase bi-directional converter, according to some embodiments.
Figure 9A:
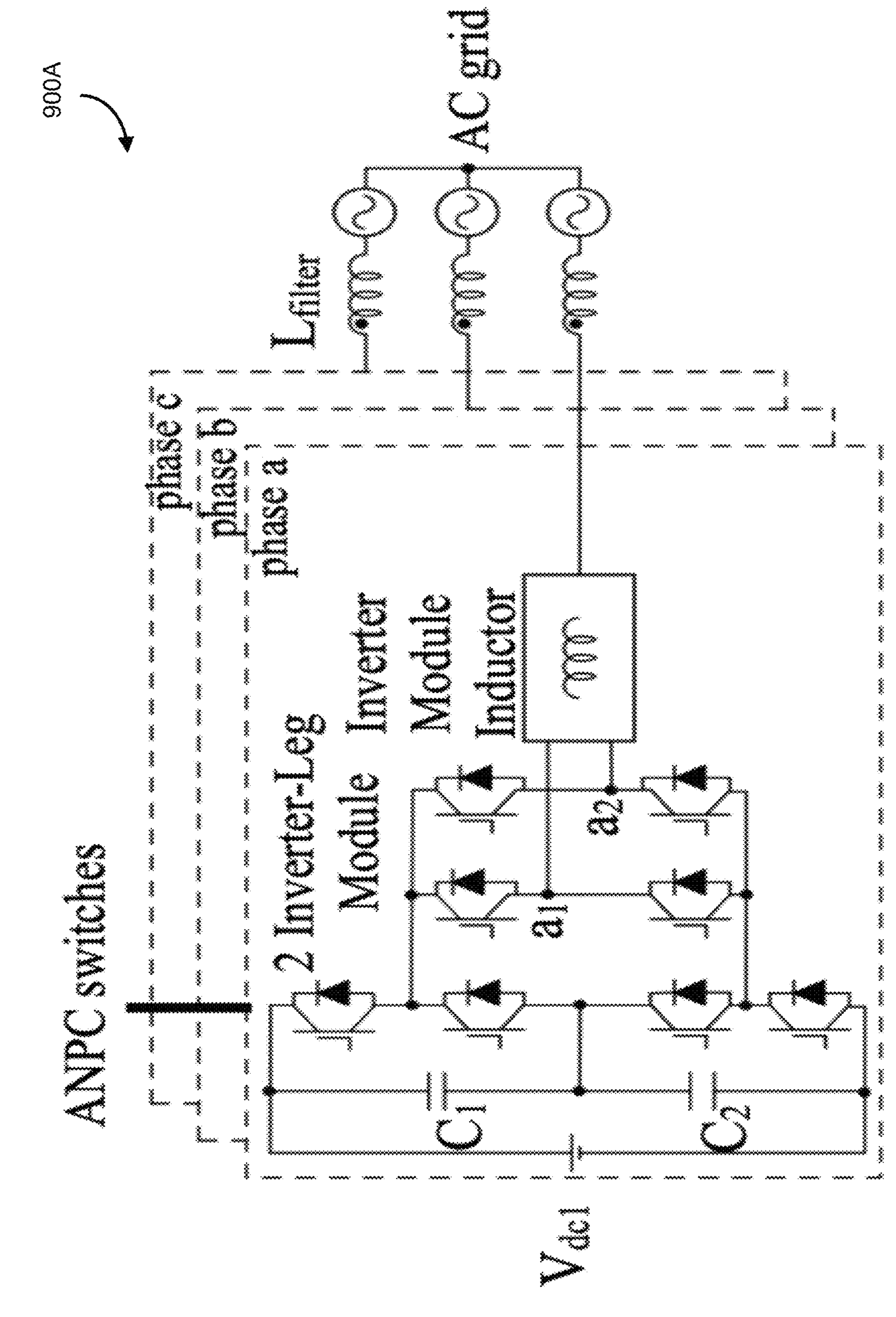
FIG. 9A is a per-phase topology circuit diagram of an NPC CII 2 legs per phase bi-directional converter, according to some embodiments.

FIG. 6A is a per-phase topology circuit diagram 600A of an NPC CII 3 legs per phase bi-directional converter, according to some embodiments. FIG. 9A is a per-phase topology circuit diagram 900A of an NPC CII 2 legs per phase bi-directional converter, according to some embodiments.

Bi-directional power flow is considered useful in many applications, such as in embodiments shown in FIGS. 6A and 9A. As a battery charger, it may allow V2G support. As a variable frequency drive interface it may allow full continuous regenerative power capability. The uni-directional power flow equivalents, such as the variations shown in FIGS. 7A and 10A for example, may reduce the number of switches and associated gate drive control circuitry.

As for the unidirectional equivalents, the switches and diodes may be exposed to half the DC rail voltage, and so experience reduced voltage stresses common with the basic NPC topology. A 3-leg inverter module 600A, or a 2-leg H-bridge 900A, may be placed on a 4 switch NPC inverter leg. This may provide advantages over alternatives where a 4 switch NPC inverter leg is used for each input to the coupled inductors. For instance, circuit 600A uses 10 switches in total per phase, whereas using a standard approach using a 4 switch inverter leg for each coupled inductor input would use 18 switches. The standard alternative to circuit 900A would use 12 switches per phase as opposed to 8 switches as shown. Therefore, in certain situations, there can be a savings through reducing the number of switches required.

Figure 6B:
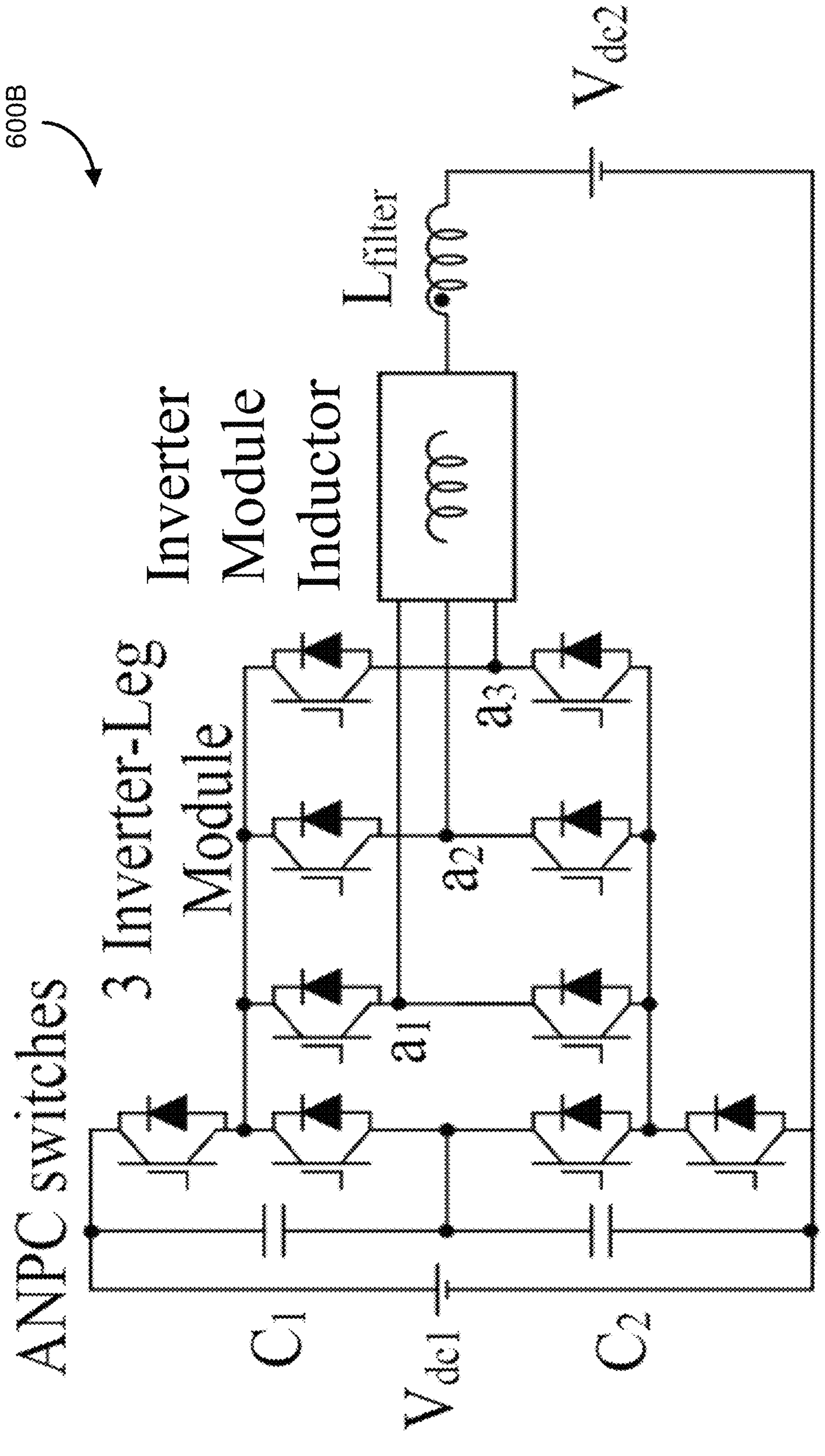
FIG. 6B is a per-phase topology circuit diagram of an NPC CII 3 legs per phase bi-directional DC/DC converter, according to some embodiments.
Figure 9B:
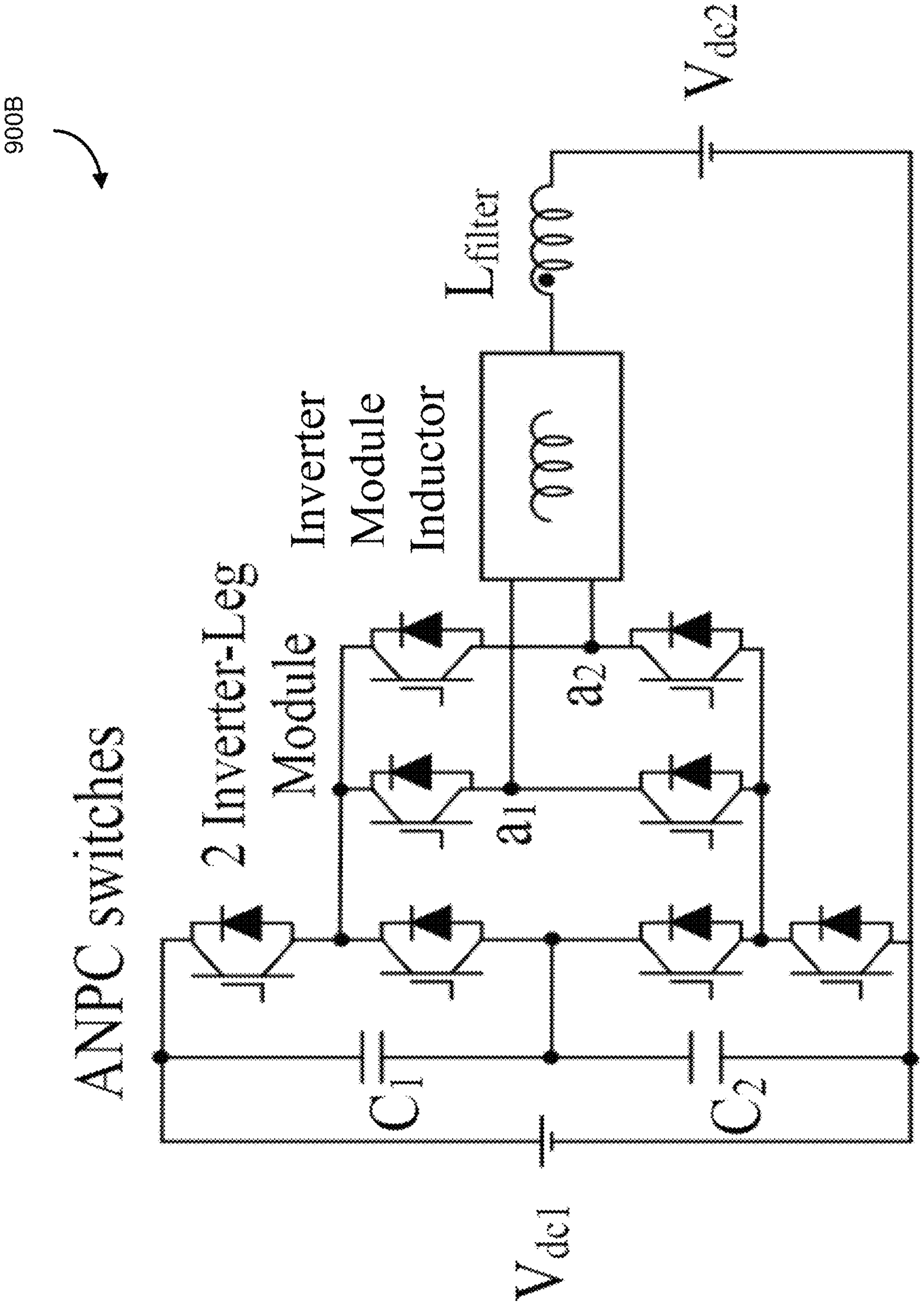
FIG. 9B is a per-phase topology circuit diagram of an NPC CII 2 legs per phase bi-directional DC/DC converter, according to some embodiments.

In some embodiments, the converters described may be implemented to perform DC/DC conversion, for example. Various topologies for the implementation of described circuit embodiments may be seen in FIGS. 6B, 7B, 9B, and 10B. FIG. 6B is a per-phase topology circuit diagram 600B of an NPC CII 3 legs per phase bi-directional DC/DC converter, according to some embodiments. FIG. 7B is a per-phase topology circuit diagram 700B of an NPC CII 3 legs per phase uni-directional DC/DC converter, according to some embodiments. FIG. 9B is a per-phase topology circuit diagram 900B of an NPC CII 2 legs per phase bi-directional DC/DC converter, —according to some embodiments. FIG. 10B is a per-phase topology circuit diagram 1000B of an NPC CII 2 legs per phase uni-directional DC/DC converter, according to some embodiments. For FIGS. 7B and 10B, for uni-directional DC/DC versions, in practical implementations, there may be a need to balance the two series capacitors shown in FIG. 7B. This is only an issue for uni-directional version. In a variation, the capacitors can be replaced with DC sources, or a voltage balancing network be used. In this variation, the two capacitors can be seen as two DC voltage sources, and practically, voltage of the two series connected capacitors are balanced through a capacitor voltage balancing network.

The circuit topology of the DC/DC converters may, in some embodiments, be similar to those of their AC/DC and DC/AC converter counterparts described above.

Inverter Module Inductor Types

Figure 12A:
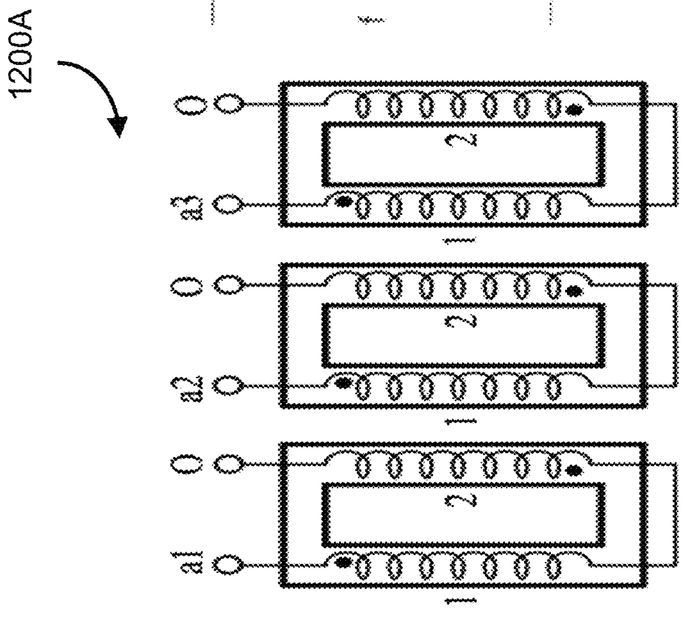
FIGS. 12A-12C are diagrams showing separate uncoupled inductors for a 3 inverter leg module, according to some embodiments.
Figure 12B:
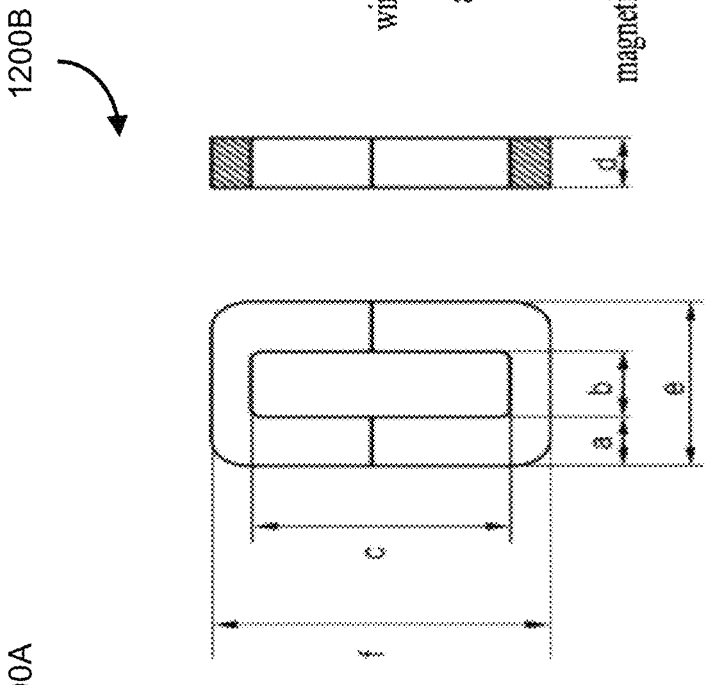
Figure 12C:
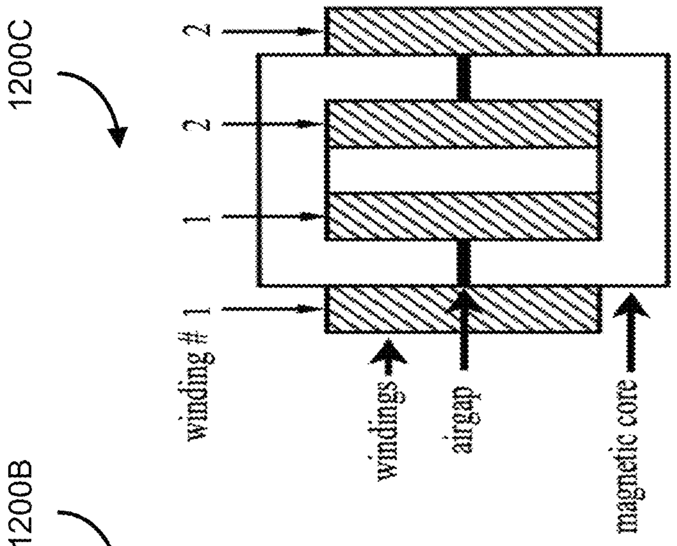
Figure 13C:
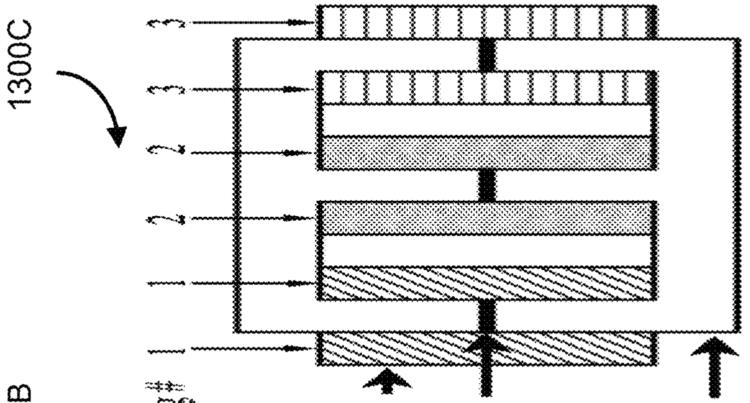
FIGS. 13A-13C are diagrams showing separate inductors with coupled limbs for a 3 inverter leg module, according to some embodiments.
Figure 13B:
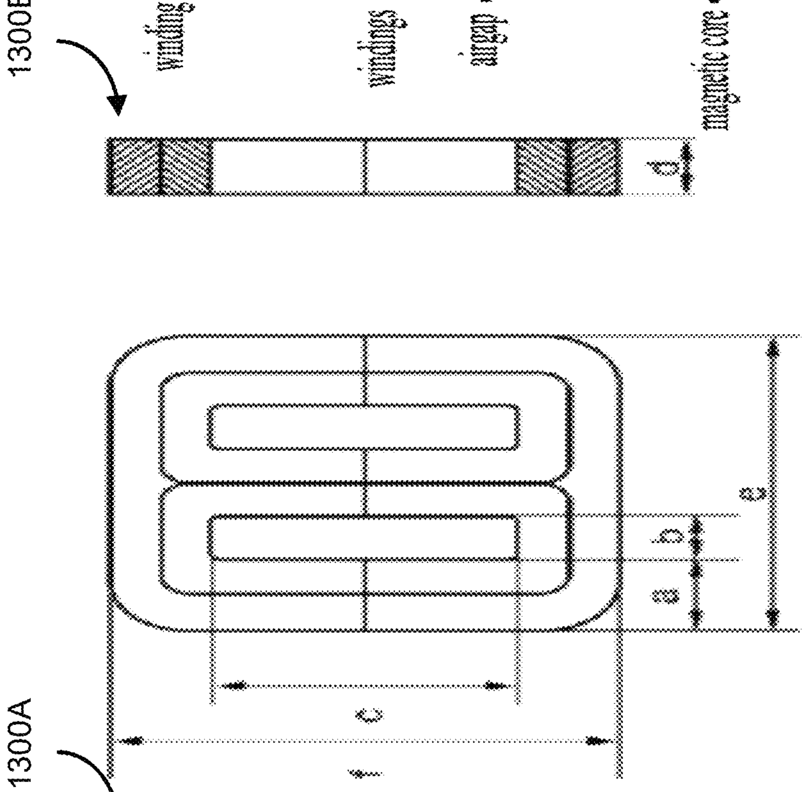
Figure 13A:
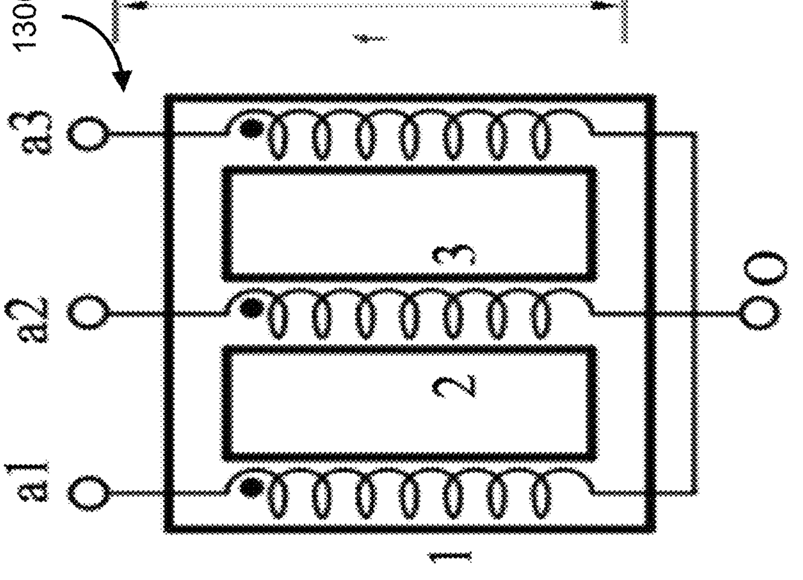
Figure 14C:
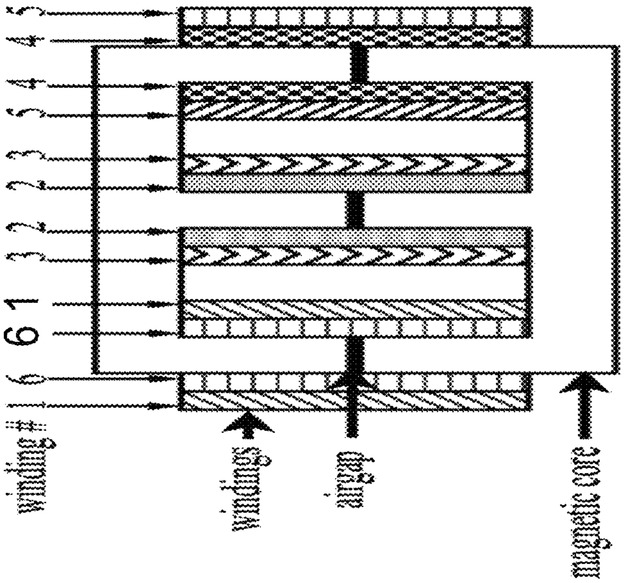
FIGS. 14A-14C are diagrams showing cross-coupled inductors for a 3 inverter leg module, according to some embodiments.
Figure 14B:
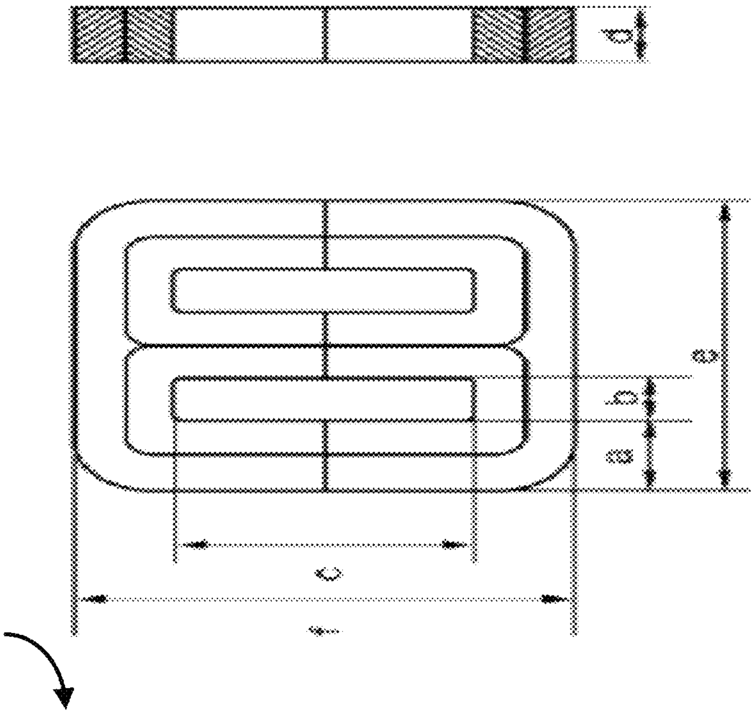
Figure 14A:
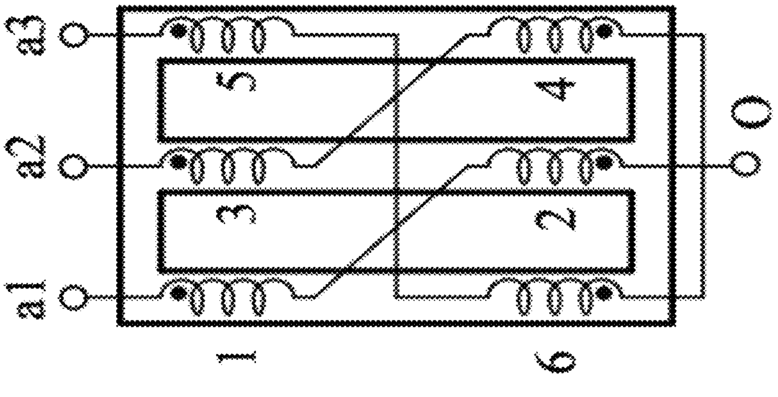
Figure 15C:
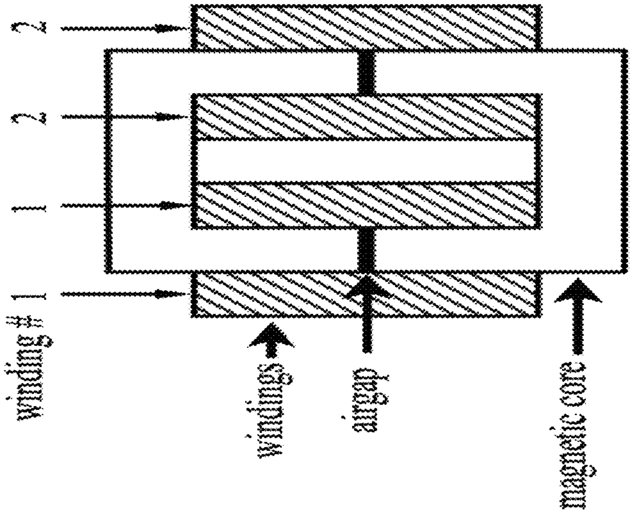
FIGS. 15A-15C are diagrams showing separate uncoupled inductors for a 2 inverter leg inductor module, according to some embodiments.
Figure 15B:
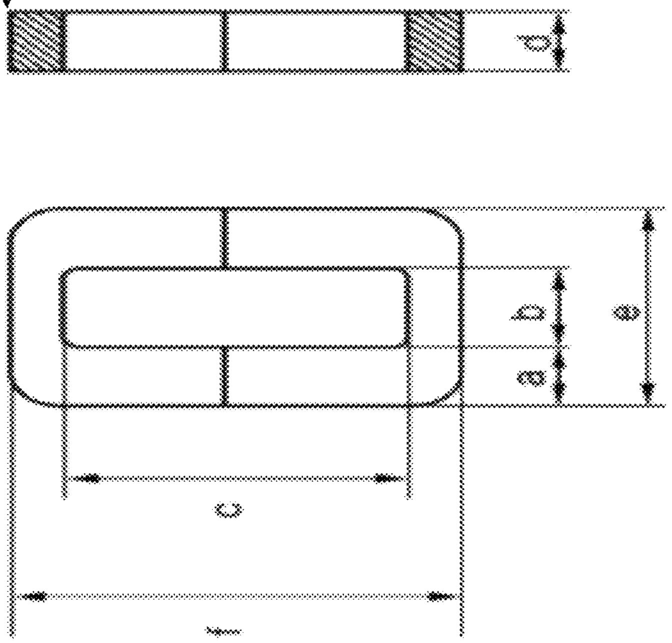
Figure 15A:
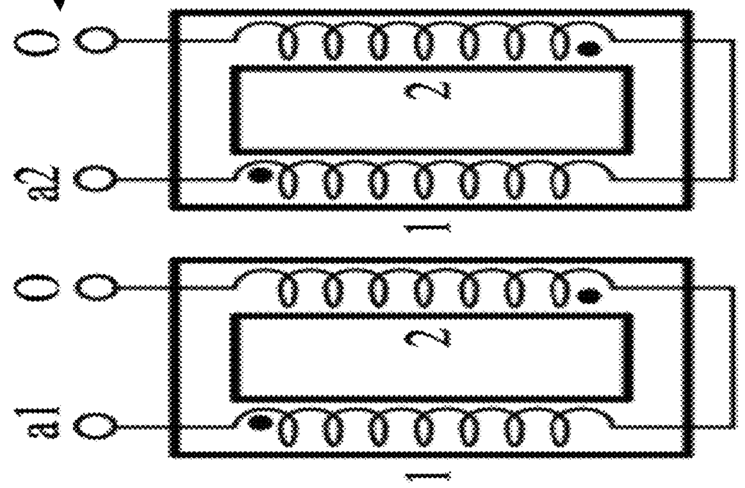
Figure 16A:
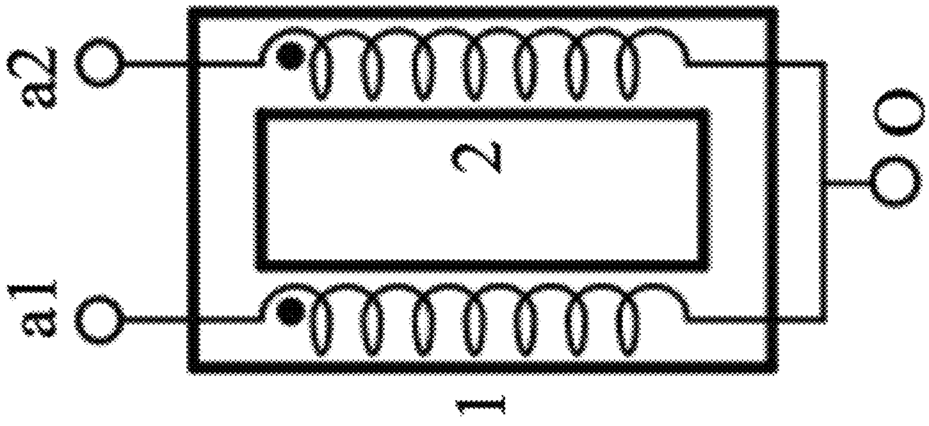
FIGS. 16A-16C are diagrams showing separate inductors with coupled limbs for a 2 inverter leg module, according to some embodiments.
Figure 16B:
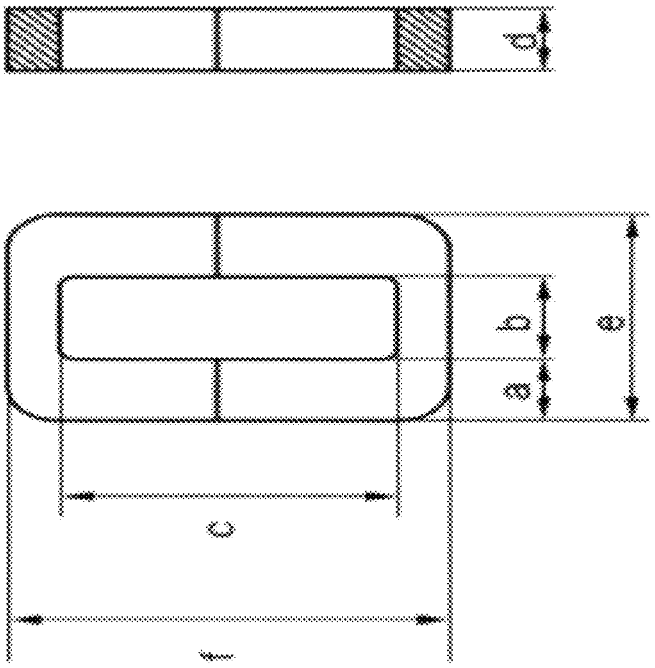
Figure 16C:
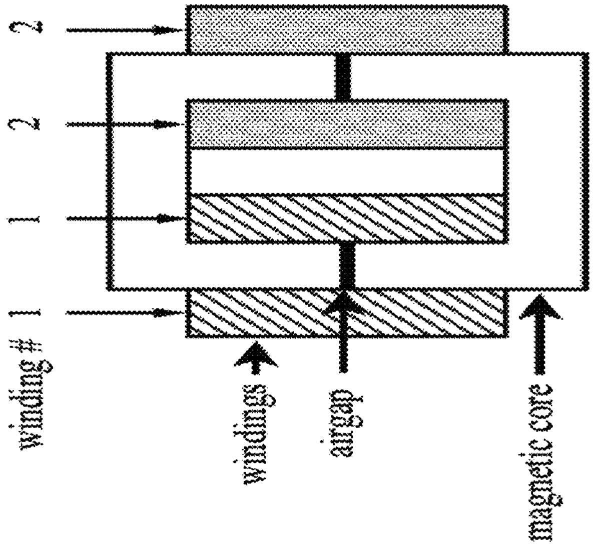
Figure 17C:
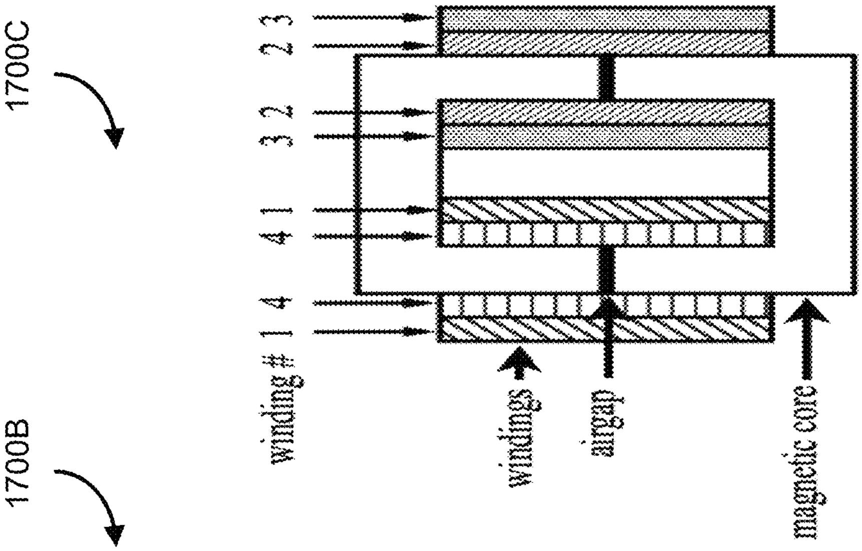
FIGS. 17A-17C are diagrams showing cross-coupled inductors for a 2 inverter module, according to some embodiments.
Figure 17B:
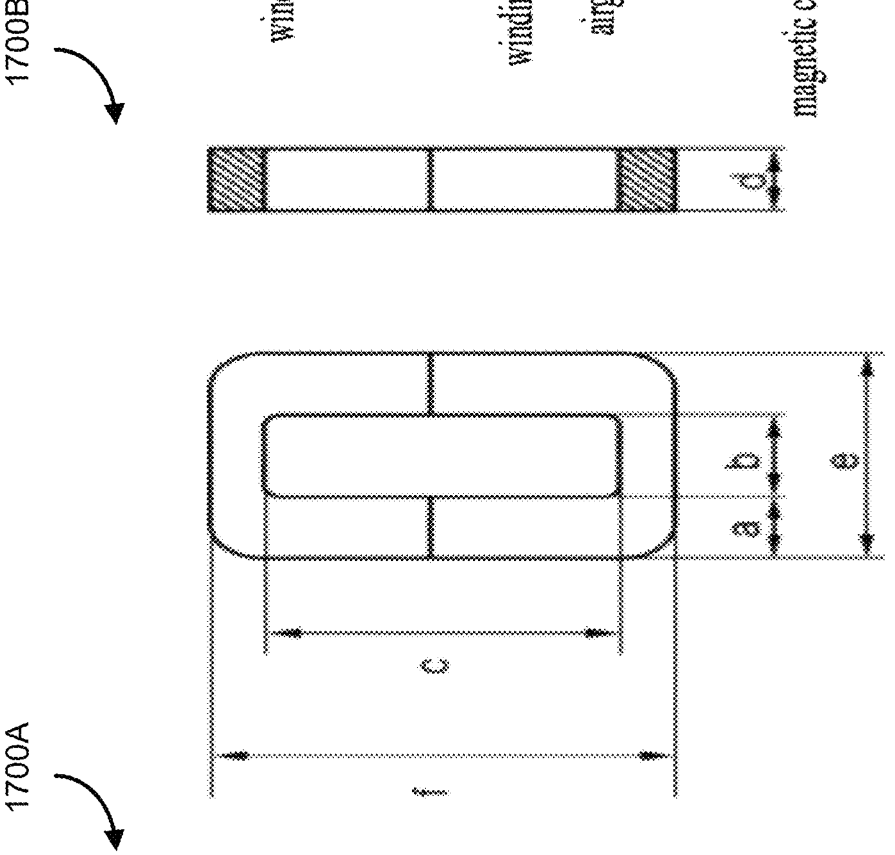
Figure 17A:
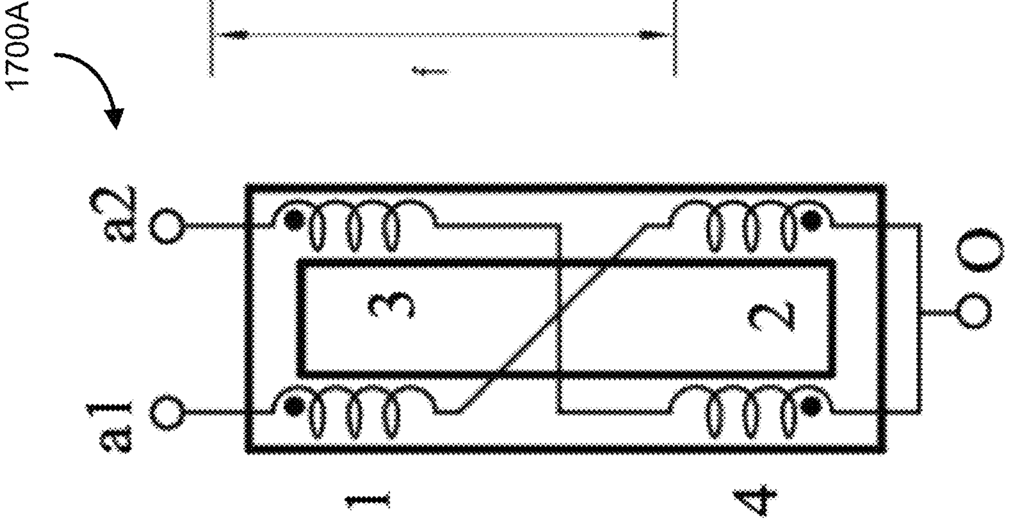

The inductor types that may be used in modules (Inverter Module Inductor), according to some embodiments, are illustrated using 3 and 2 inverter leg modules in FIGS. 8 and 11. More details of inductor designs, according to some embodiments, are given in FIGS. 12-14 for the 3 inverter module, and FIGS. 15-17 for the 2 inverter module. Inductor type 1 (separate inductors per inverter leg), such as separate inductors 806, 1106, may act as a current source with a low ripple high frequency output current. Types 2 (separate limbs magnetically coupled), such as limbed inductors 804, 1104, and type 1 (cross coupled inductors), such as cross-coupled inductors 802, 1102, may act as a voltage source multi-level output voltage with a high frequency pulses (e.g., PWM frequency).

(1) Type 1: Separate Inductors

Separate inductors may be placed in series with each inverter leg output terminal that connects the inverter legs in a parallel arrangement, such as 806 and 1106 in FIGS. 8 and 11, and FIGS. 12 and 15. FIGS. 12A-12C are diagrams showing separate uncoupled inductors for a 3 inverter leg module, according to some embodiments. According to some embodiments, 1200A shows the windings and 2-limb cores, 1200B shows the core dimensions, and 1200C shows a cross-section of the windings and core. Similarly, FIGS. 15A-15C are diagrams showing separate uncoupled inductors for a 2 inverter leg module, according to some embodiments. According to some embodiments, 1500A shows the windings and 2-limb cores, 1500B shows the core dimensions, and 1500C shows a cross-section of the windings and core.

These inductors may filter the switch mode output voltage pulses of each inverter leg, and the output current at terminal O, shown in 1200A and 1500A, may be the sum of each inductor current. In some embodiments, the switching of each inverter leg may be achieved using interleaved switching so that each inverter leg output voltage may have pulses that are evenly phase distributed in a switching cycle. The phase of the inductor high frequency ripple currents are thus evenly distributed and the resultant output current, being the sum of each inductor current, can have a reduced current ripple with a ripple frequency higher than the inverter switching frequency. The reduction in the output ripple current and increased frequency is related to the number of inverter legs used in each module. The value of the inductor, may in some embodiments, be chosen to: (a) control the circulating currents between the inverter legs, and (b) control the magnitude of the output current ripple.

Type 1 separate inductors are different to inductor types 2 and 3 in that they may provide a high frequency output current ripple as opposed to a multi-level voltage, and can be viewed as supplying a current source to the load. Inductor type 1 may be utilized for its simplicity and ease of connecting in parallel: the inductors in series with each inverter leg are not coupled. Type 1 separate inductors have four main undesirable features when compared to the other two inductor types: (a) the output inductance of the system is large and can suffer from a significant drop in the output voltage in AC systems, (b) the power current flowing through the inductor, DC or AC, produces a flux in the inductor magnetic core and significantly increases the inductor size when compared to the either of the other two coupled inductor types, (c) a design conflict exists between choosing an inductor size to control the circulating currents versus controlling the output current ripple, (d) the transient response of the systems can be reduced significantly.

When compared with converter systems where the inverter legs connected directly to the DC source, such as in FIGS. 3 and 4, the NPC and ANPC converters may reduce the voltage applied to the inverter module inductor. This can be used to reduce the size of the inductors and/or reduce the ripple in the module output current.

(2) Type 2: Separate Limbs

In some embodiments, the inductor windings may be located on separate limbs that are magnetically coupled to each other, which may be seen, for example at 804 and 1104 in FIGS. 8 and 11, and FIGS. 13 and 16. FIGS. 13A-13C are diagrams showing separate inductors with coupled limbs for a 3 inverter leg module, according to some embodiments. According to some embodiments, 1300A shows the windings and 3-limb cores, 1300B shows the core dimensions, and 1300C shows a cross-section of the windings and core. Similarly, FIGS. 16A-16C are diagrams showing separate inductors with coupled limbs for a 2 inverter leg module, according to some embodiments. According to some embodiments, 1600A shows the windings and 3-limb cores, 1600B shows the core dimensions, and 1600C shows a cross-section of the windings and core.

Separate limbs may be utilized when using a 2 inverter leg system, for instance. Each inductor winding may be placed in series with an inverter leg having its own magnetic flux path but also located on the same magnetic core. In contrast with the type 1 inductors using separate inductors, the main AC power current does not produce a significant flux in the magnetic core, and hence results in a much smaller physical inductor size. The switching of each inverter leg may be achieved using interleaved switching so that each inverter leg output voltage has pulses that are evenly phase distributed in a switching cycle. The coupling of the windings may result in two main features, in some embodiments: (a) the output of each module, in contrast to type 1, may function as a multi-level voltage source with a low inductance. The power conversion process may have a rapid transient capability and can be used with high frequency AC systems, (b) the main inductance value may be chosen to limit the high frequency circulating currents between the inverter legs. The output inductance is related to inter-limb leakage flux and may be significantly lower than the type 1 inductors, but significantly higher than the type 3 inductors. As a result, the output voltage has a lower droop with load than the type 1 inductors but higher than the type 3 inductors.

When compared with inverter legs connected directly to the DC source, such as those shown in FIGS. 3 and 4, the NPC and ANPC converters may reduce the voltage applied to the inverter module inductor. This, in some embodiments, increases the number of steps in the voltage source output (almost double, for example) and halves the magnitude of the voltage steps. This may improve the quality of the output voltage, as seen in FIG. 5A, 5B, making the output more sinusoidal in nature. With appropriate switching control, the common mode voltage between the AC or DC source and the output can be reduced, shown in FIG. 5A, 5B, hence reducing parasitic common mode currents and the use of common mode filters.

(3) Type 3—Cross-Coupled Inductors

In some embodiments, the output of each inverter leg may have two windings connected in series where the windings are located in separate magnetic flux paths, often as a result of locating the 2 windings on separate limbs of the inductor, as shown at 802 and 1102 in FIGS. 8 and 11, and FIGS. 14 and 17. FIGS. 14A-14C are diagrams showing cross-coupled inductors for a 3 inverter leg module, according to some embodiments. According to some embodiments, 1400A shows the windings and 3-limb cores, 1400B shows the core dimensions, and 1400C shows a cross-section of the windings and core. Similarly, FIGS. 17A-17C are diagrams showing cross-coupled inductors for a 2 inverter leg module, according to some embodiments. According to some embodiments, 1700A shows the windings and 3-limb cores, 1700B shows the core dimensions, and 1700C shows a cross-section of the windings and core.

However, in some embodiments, two windings may be located on the same limb where the two windings are connected in series with two different inverter leg outputs. The leakage flux between these two windings is related to intra-limb leakage flux as opposed inter-limb leakage for the type 2 inductors. This results in a tight coupling of the two windings, resulting in the output inductance of each module being significantly lower than the type 2 inductor: intra-limb leakage flux is much lower than inter-limb leakage flux as a result of the two windings located on the same limb being physically closer to each other than two windings located on separate limbs. This inductor type may have the same benefits as for the type 2 coupled inductor in some embodiments, mainly: (a) a reduction in the inductor size as a result of the main AC power current not producing significant flux in the core, (b) the output may act as a multi-level voltage source with a low inductance and with a high PWM pulse frequency. These features may significantly reduce the size of output filters when used. The effect of having 2 windings located close to each other can result in proximity effects such as inter-winding capacitive coupling and a reduced voltage stress capability. As opposed to the type 2 coupled inductor, this inductor type requires more careful design of the windings to limit these effects, according to some embodiments.

This inductor type may have the same benefits as type 2 when using NPC and ANPC inverter legs as opposed to having the parallel inverter legs being connected across the DC source: (a) the voltage stresses across the switches and diodes may be halved, (b) the voltage applied to the inverter module inductor may be halved, increasing the number of steps in the voltage source output (almost double, for example) and halving the magnitude of the voltage steps, (c) the common mode voltage between the AC or DC source and the output may be reduced, (d) a smaller inverter module inductor can be used. The type 3 inductor has the additional benefit of a much lower output inductance than the type 2, hence reducing droops in the output voltage in AC systems and hence making a much higher fundamental frequency to be more feasible, in some embodiments.

Switching Gating Control

Several techniques for the gating control of parallel connected inverter legs may now be described, however other control techniques may be used in some embodiments: Space Vector PWM (SV-PWM), Phase Disposition PWM (PD-PWM), and Phase Shifted PWM (PS-PWM). A gating control for the inverter legs, according to some embodiments, is described here for AC systems using PS-PWM and phase-shifted carriers. For n inverter legs, n evenly phase-shifted carriers may be used to control each inverter leg. The phase-shift angle for each carrier can be given by: (360°*[0, 1/n, 2/n . . . , (n−1)/(n+1)]). As a result, (2n+1) levels are produced in the phase output voltages, and (4n+1) level voltages in the line voltage of a 3-phase AC grid. The frequency of the PWM pulses the line voltages may be 2n times higher than the switching frequency of each inverter leg. Lastly, the same reference signal may be used to control all inverter legs in the same phase.

As a non-limiting example, consider that a 3-phase grid using 3 inverter legs per phase, 3 carriers are used (0°, 120°, 240°) to control the switching pattern of each inverter leg in each phase. 4 and 7 voltage levels are present in the phase and line voltages respectively.

The quality of the line voltages can be improved further by switching the phases of the carriers using 2 carriers to control the switching pattern of each inverter leg. The phase of the two carriers may be determined by the number of inverter legs used: (360°[0, 1/n, 2/n, . . . (n−1)/(n+1)]) and (360° [½n, 3/2n . . . , (2n−1)/2n]).

Consider an exemplary case of using a 3 inverter leg module in each phase of a 3-phase system. The inverter leg in phase a, output denoted a1, uses two carriers to control its switching: 0° and 60°. If the reference signal is considered to vary in the range ±1 using triangular carriers with the magnitude ±1, then the reference signal can be divided into 3 regions (1 to ⅓, ⅓ to −⅓, −⅓ to −1). The phases of the two carriers is changed as the reference signal transitions between the 3 different regions and given by:

$$\text{Region 1: } 1 \geq ma \leq +1/3 \text{ carriers } (60^{\circ}, 180^{\circ}, 300^{\circ})$$

$$\text{Region 2: } +1/3 \geq ma \leq -1/3 \text{ carriers } (0^{\circ}, 120^{\circ}, 240^{\circ})$$

$$\text{Region 3: } -1/3 \geq ma \leq -1 \text{ carriers } (60^{\circ}, 180^{\circ}, 300^{\circ})$$

The described systems, methods, and devices, in some embodiments, present a combined switch/inductor module where parallel connected inverter legs can be connected together using three main types of inductors: (a) type 1 separate inductors, (b) type 2 separate limbs, (c) type 3 cross-coupled inductors. In some embodiments, each module consists of parallel connected inverter legs connected to a single NPC or ANPC inverter leg. This may reduce the total number of switches and diodes that are often used in conventional parallel connected systems. Designs are given for the practical design of 3 main inductor types, according to some embodiments.

For type 1 separate inductors in FIGS. 12A-C and FIGS. 15A-C, separate inductors can be placed in series with each inverter leg output terminal that connects the inverter legs in a parallel arrangement. This inductor type has 4 main challenges when compared to the other 2 inductor types: (a) the output inductance of the system is large and can suffer from a significant drop in the output voltage in ac systems, (b) the power current flowing through the inductor, dc or ac, produces a flux in the inductor magnetic core and significantly increases the inductor size when compared to the either of the other two coupled inductor types, (c) a design conflict exists between choosing an inductor size to control the circulating currents versus controlling the output current ripple, (d) the transient response of the systems can be reduced significantly. Accordingly, while feasible, this inductor type is the least desirable of the 3 exemplary inductor designs. However, there may be practical usage scenarios where it is helpful.

For type 2 separate limbs in FIGS. 13A-C and FIGS. 16A-C, coupled inductors are proposed. The coupling of the windings results in two main features: (a) the output of each module, in contrast to type 1, functions as a multi-level voltage source with a low inductance. The power conversion process has a rapid transient capability and can be used with high frequency ac systems, (b) the main inductance value is chosen to limit the high frequency circulating currents between the inverter legs. These benefits result in a smaller physical inductor size and a reduction in the material used.

For type 3, cross-coupled inductors in FIGS. 14A-C and FIGS. 17A-C, the tight coupling of windings in a cross-coupled inductor, which results in a significantly lower output inductance for each module compared to type 2 inductors. This inductor type has similar but improved benefits compared to the type 2 coupled inductor, mainly: (a) a reduction in the inductor size as a result of the main ac power current not producing significant flux in the core, (b) the output acts as a multi-level voltage source with a low inductance and with a high PWM pulse frequency. These features significantly reduce the size of output filters when used. Type 3 inductors are the preferred inductor for NPC-CII, but more technically challenging to design where proximity effects such as inter-winding capacitive coupling and reduced voltage stress capability must be considered. Type 2 inductors are the most pragmatic to design while attaining the benefits of NPC-CII.

Some of the main benefits of using the switch/inductor module structure described are as follows (in some embodiments, other benefits may be provided than those listed):

(a) Coupled inductors may allow for smaller inductors to be used, including reducing the total filter inductor size when used with a standard filter inductor or LCL filter, for instance. In the case of the latter, an LCL filter can be reduced to just an LC filter due to the drastic reduction in the output current ripple. When used with parallel connected inverters, multi-level PWM output voltages may be produced with PWM frequencies much higher than the converter switching frequency. This in turn may reduce the size of the AC filters that may be required.

(b) Since the voltage steps produced may be lower than the DC bus voltage, the topologies may lower the interaction of the converter with cables, filters and transformers. The total filter size can be reduced.

(c) The number of voltage levels produced in the line voltage can be made very high when using the NPC CII variations, and the output voltages may become much closer to the desired waveshape (e.g., sine wave).

(d) The use of cross-coupled inductors in each phase may allow the phase outputs independent of each other and the rectifiers can cope with unbalanced AC supply voltages and currents. This feature also may make the topologies capable of transmitting power even if one phase is lost.

(e) Cross coupled inductor implementations may allow for modular designs that can use N inverter legs, introduce redundancy where required, and improve reliability and fault protection that allow operation even under the failure of an inverter leg.

(f) Improved power conversion efficiency can be obtained under lower power conditions by operating a fewer number of inverters to supply the lower current settings.

(g) When a DC bus system is being fed power using the presented systems, methods, and/or devices, the reduction in the common mode voltage between the grid and the DC bus can be beneficial in lowering the interaction with multiple loads that may be placed on the same DC bus.

Figure 18:
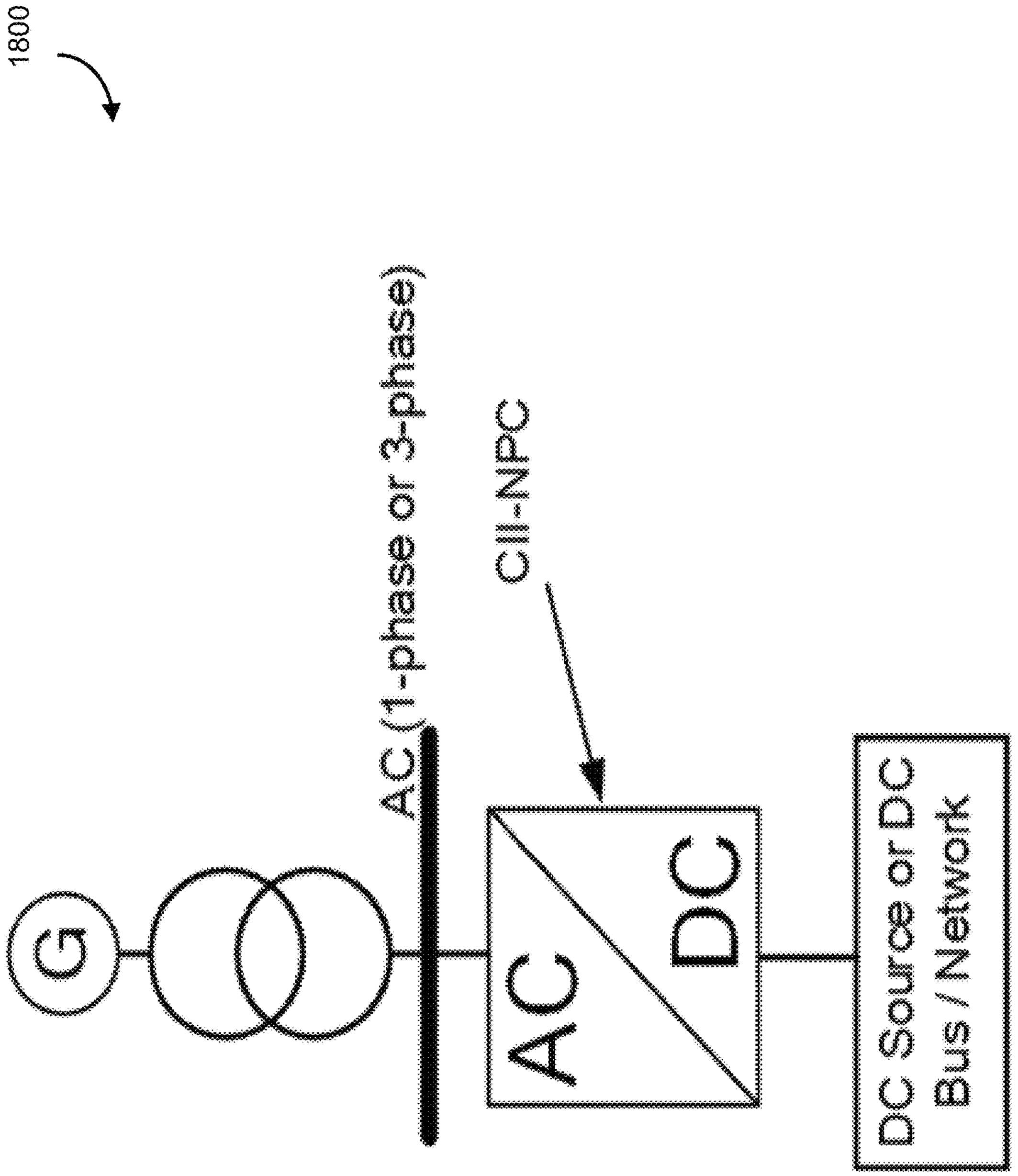
FIG. 18 is an example pictorial description of the CII-NPC circuit being used as an interconnector AC/DC between an AC grid (1 phase or 3 phase) and a DC Source or DC Bus/Network, according to some embodiments.

FIG. 18 is an example pictorial description 1800 of the CII-NPC circuit being used as an interconnector AC/DC between an AC grid (1 phase or 3 phase) and a DC Source or DC Bus/Network, according to some embodiments.

The CII-NPC circuit can be seen as a grid-connected converter (rectifier if the NPC front-end is specifically used making it unidirectional). In this approach, the circuit is being used to interface with an AC network and connecting it to a DC source or DC Bus/Network. In these variations, the approach does not necessarily have to connect to a battery all the time.

Figure 19:
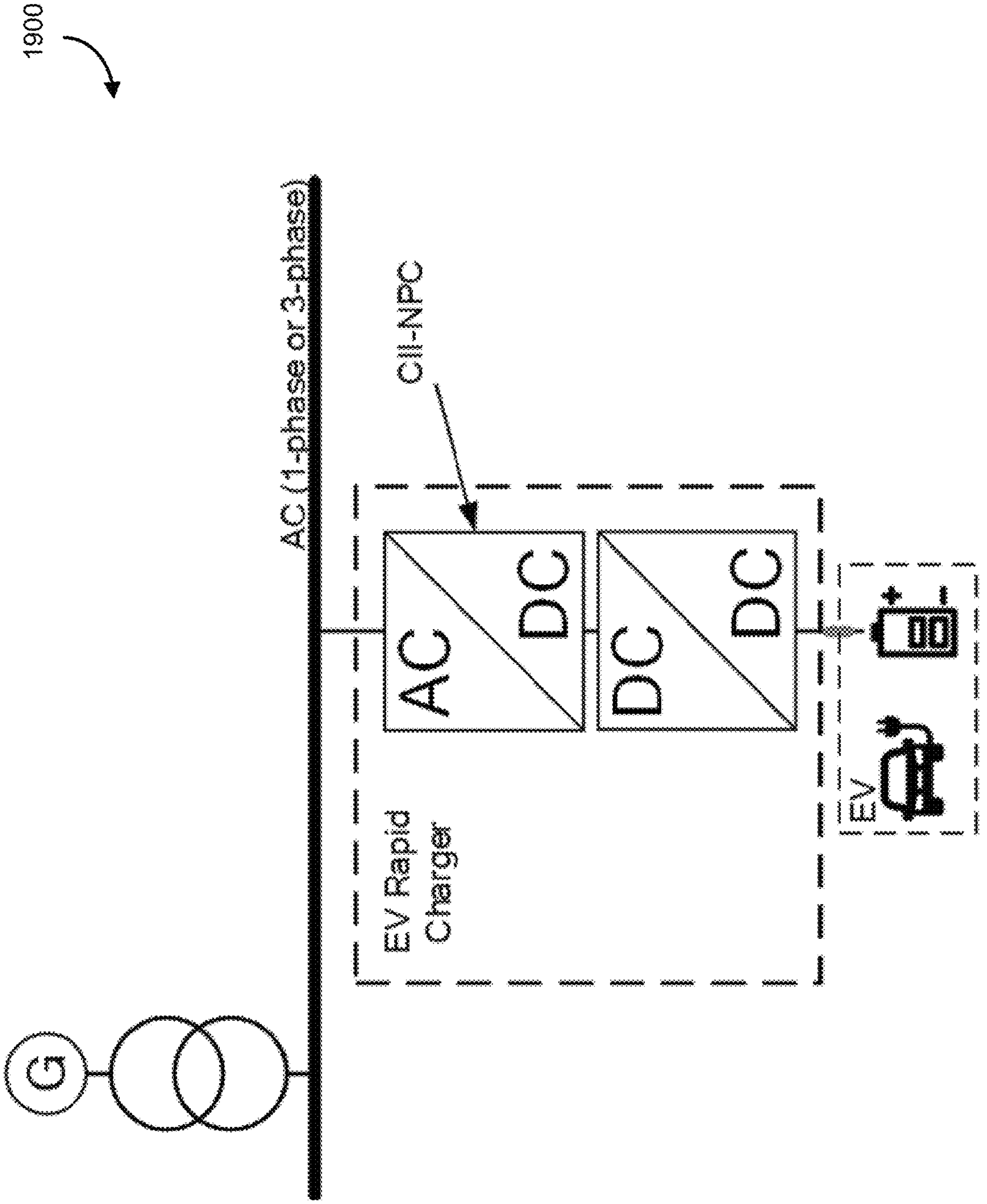
FIG. 19 is an example pictorial description of the CII-NPC circuit being used as an interconnector ultimately for charging of an EV, according to some embodiments.

FIG. 19 is an example pictorial description 1900 of the CII-NPC circuit being used as an interconnector ultimately for charging of an EV, according to some embodiments. A specific application is shown as an example for EV charging here.

Figure 20:
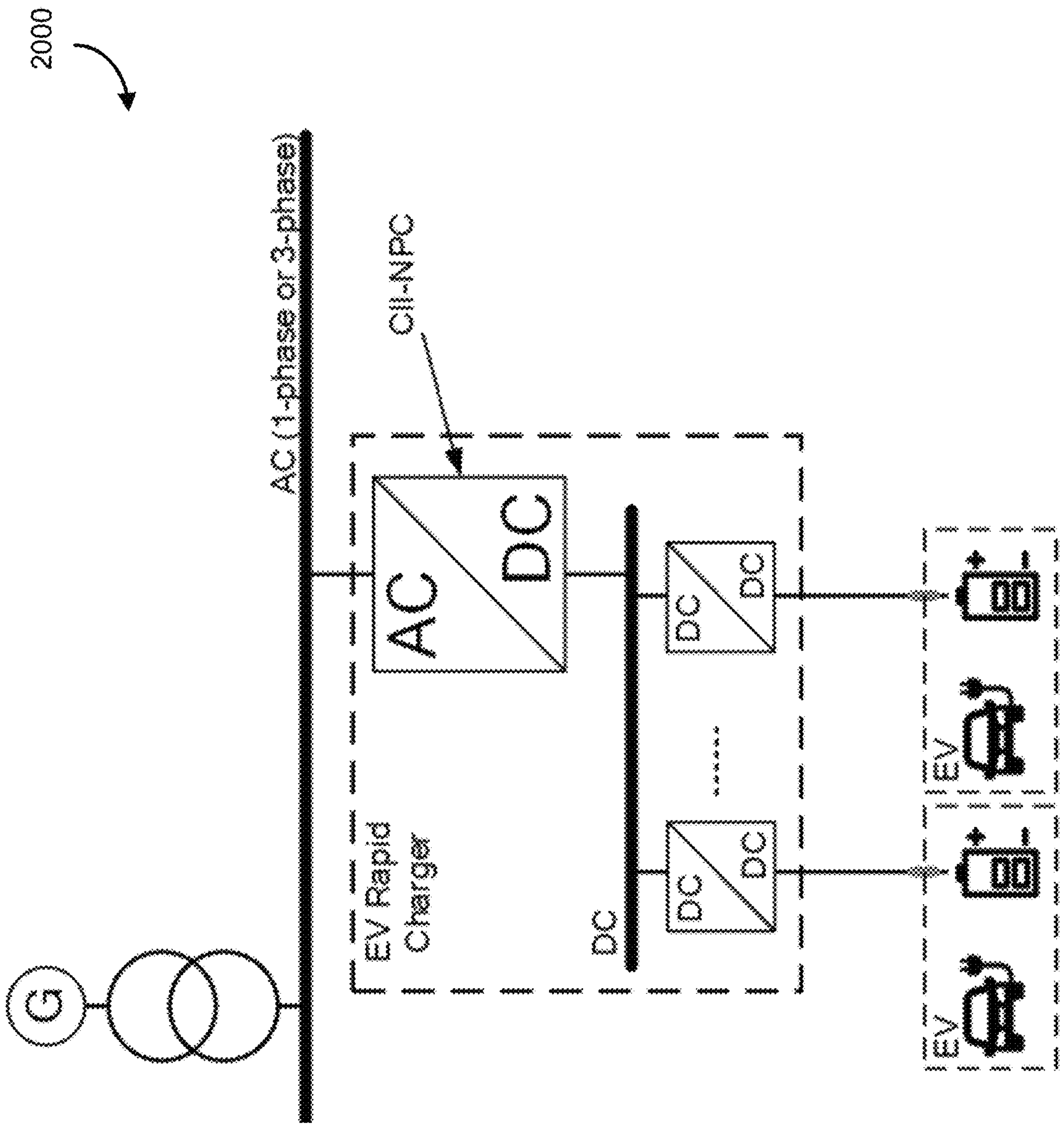
FIG. 20 is an example pictorial description of the CII-NPC circuit being used as an interconnector ultimately for charging of multiple EVs, according to some embodiments.

FIG. 20 is an example pictorial description 2000 of the CII-NPC circuit being used as an interconnector ultimately for charging of multiple EVs, according to some embodiments.

Applicants develop leading-edge technologies in relation to electrical infrastructure, and the approaches described herein can be utilized for improving the adoption of green (or greener) technologies, such as low or zero-emission EVs. The EVs may have on-board energy storage devices, such as batteries, capacitors, etc., that may require charging. In some EVs, there are different energy storage devices adapted for different operation, and each of these may require different voltages.

The EVs can include innovative powertrain technology optimized for battery performance and reduced charging times, including, in some cases, bi-directional charging and direct charging from renewable energy sources, such as wind and solar. A powertrain of an EV, for example, includes a battery, a motor, and an inverter, and these work together to convert energy storage device energy from DC to AC for the motor, motor speed, and capturing energy from regenerative braking.

While electrical components are utilized to support the powertrain, these electrical components contribute to weight, bulk, and expense.

EV technology can be further improved by optimizing and reducing the need for various electrical components, such as on-board chargers in some cases, reducing overall system complexity, lowering manufacturing costs, and reducing weight. These may impact, for example, charging speed, EV range, etc. Less weight leads to better driving performance, fewer parts leads to improved reliability, reduced volume leads to more physical space being available for comfort or new technologies, and lower cost is critical for mass-market adoption.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A grid-connected converter device for interfacing a grid network and coupling the grid network to a direct current (DC) source or DC bus/network, the device comprising:

a neutral-point-clamped inverter circuit having a voltage $v_{dc}$ across the direct current (DC) source or DC bus/network, the neutral-point-clamped inverter circuit including one or more switch legs, each switch leg comprising a corresponding pair of switches having an electrical midpoint between the switches of the pair of switches; and an inductor network coupled to the neutral-point-clamped inverter circuit, the inductor network comprising a set of parallel inductor legs, each parallel inductor leg coupled to a corresponding electrical midpoint of a corresponding switch leg and also coupled to an output electrical node coupled to the grid network;

wherein the grid network is an AC network that has a plurality of phases and each phase has a corresponding output electrical node being coupled to a corresponding neutral-point-clamped inverter circuit and a corresponding inductor network;

wherein the neutral-point-clamped inverter circuit includes two switch legs per phase of the plurality of phases;

wherein the device operates with at least one of the characteristics selected from a group consisting of: a line voltage PWM frequency is $4\times f_c$, a number of line voltage steps is $v_{dc}/4$, a number of line voltage steps is 9, of a common mode voltage is $+/-v_{dc}/8$.

2. The device of claim 1, wherein the neutral-point-clamped inverter circuit includes:

a first stage having an upper capacitor and a lower capacitor connected across an NPC electrical midpoint, an upper pair of clamping diodes or switches, and a lower pair of clamping diodes or switches, the upper and lower pair of clamping diodes or switches coupled across the NPC electrical midpoint; and a second stage including the one or more switch legs, each of the switch legs coupled to an electrical midpoint of the upper pair of clamping diodes or switches, and an electrical midpoint of the lower pair of clamping diodes or switches.

3. The device of claim 1, wherein the inductor network is a coupled inductor network having parallel inductor limbs and the coupled inductor network includes inductor windings on separate limbs of the parallel inductor limbs that are magnetically coupled to each other, and switching of the each parallel inductor legs is conducted using interleaved switching so that each inverter leg output voltage has pulses that are evenly phase distributed in a switching cycle.

4. The device of claim 1, wherein the inductor network is a coupled inductor network having cross-coupled inductor limbs and an output of each switch leg of the inverter circuit may have two windings connected in series where the two windings reside in separate magnetic flux paths.

5. The device of claim 1, wherein the inductor network includes parallel filter inductor limbs and the parallel filter inductor limbs are separate inductors that together provide a high frequency output current ripple and supply a current source to a load.

6. A method for a grid-connected converter interfacing a grid network and coupling the grid network to a direct current (DC) source or DC bus/network, the method comprising:

providing a neutral-point-clamped inverter circuit having a voltage $v_{dc}$ across the direct current (DC) source or DC bus/network, the neutral-point-clamped inverter circuit including one or more switch legs, each switch leg comprising a corresponding pair of switches having an electrical midpoint between the switches of the pair of switches; and providing an inductor network coupled to the neutral-point-clamped inverter circuit, the inductor network comprising a set of parallel inductor legs, each parallel inductor leg coupled to a corresponding electrical midpoint of a corresponding switch leg and also coupled to an output electrical node coupled to the grid network;

wherein the grid network is an AC network that has a plurality of phases, and each phase has a corresponding output electrical node being coupled to a corresponding neutral-point-clamped inverter circuit and a corresponding inductor network;

wherein the neutral-point clamped inverter circuit includes two or three switch legs per phase of the plurality of phases;

wherein when the neutral-point-clamped inverter circuit includes two switch legs per phase, the method operates with at least one of the characteristics selected from the group consisting of a line voltage PWM frequency is $4\times f_c$, a number of line voltage steps is $v_{dc}/4$, a number of line voltage steps is 9, or a common mode voltage is $+/-v_{dc}/8$; and wherein when the neutral-point-clamped inverter circuit includes three switch legs per phase, the method operates with at least one of the characteristic selected from the group consisting of: the line voltage PWM frequency is $6\times f_c$, the number of line voltage steps is $v_{dc}/6$, the number of line voltage steps is 13, or the common mode voltage is $+/-v_{dc}/12$.

7. The method of claim 6, wherein the neutral-point-clamped inverter circuit includes:

a first stage having an upper capacitor and a lower capacitor connected across an NPC electrical midpoint, an upper pair of clamping diodes or switches, and a lower pair of clamping diodes or switches, the upper and lower pair of clamping diodes or switches coupled across the NPC electrical midpoint; and a second stage including the one or more switch legs, each of the switch legs coupled to an electrical midpoint of the upper pair of clamping diodes or switches, and an electrical midpoint of the lower pair of clamping diodes or switches.

8. The method of claim 6, wherein the inductor network is a coupled inductor network having parallel inductor limbs and the coupled inductor network includes inductor windings on separate limbs of the parallel inductor limbs that are magnetically coupled to each other, and switching of the each parallel inductor legs is conducted using interleaved switching so that each inverter leg output voltage has pulses that are evenly phase distributed in a switching cycle.

9. The method of claim 6, wherein the inductor network is a coupled inductor network having cross-coupled inductor limbs and an output of each switch leg of the inverter circuit may have two windings connected in series where the two windings reside in separate magnetic flux paths.

10. The method of claim 6, wherein the inductor network includes parallel filter inductor limbs and the parallel filter inductor limbs are separate inductors that together provide a high frequency output current ripple and supply a current source to a load.

11. A grid-connected converter device for interfacing a grid network and coupling the grid network to a direct current (DC) source or DC bus/network, the device comprising:

a neutral-point-clamped inverter circuit having a voltage $v_{dc}$ across the direct current (DC) source or DC bus/network, the neutral-point-clamped inverter circuit including one or more switch legs, each switch leg comprising a corresponding pair of switches having an electrical midpoint between the switches of the pair of switches; and an inductor network coupled to the neutral-point-clamped inverter circuit, the inductor network comprising a set of parallel inductor legs, each parallel inductor leg coupled to a corresponding electrical midpoint of a corresponding switch leg and also coupled to an output electrical node coupled to the grid network;

wherein the grid network is an AC network that has a plurality of phases and each phase has a corresponding output electrical node being coupled to a corresponding neutral-point-clamped inverter circuit and a corresponding inductor network;

wherein the neutral-point-clamped inverter circuit includes three switch legs per phase of the plurality of phases;

wherein the device operates with at least one of the characteristics selected from the group consisting of: a line voltage PWM frequency is $6 \times f_c$, a number of line voltage steps is $v_{dc}/6$, a number of line voltage steps is 13, or a common mode voltage is $+/-v_{dc}/12$.

12. The device of claim 11, wherein the neutral-point-clamped inverter circuit includes:

a first stage having an upper capacitor and a lower capacitor connected across an NPC electrical midpoint, an upper pair of clamping diodes or switches, and a lower pair of clamping diodes or switches, the upper and lower pair of clamping diodes or switches coupled across the NPC electrical midpoint; and a second stage including the one or more switch legs, each of the switch legs coupled to an electrical midpoint of the upper pair of clamping diodes or switches, and an electrical midpoint of the lower pair of clamping diodes or switches.

13. The device of claim 11, wherein the inductor network is a coupled inductor network having parallel inductor limbs and the coupled inductor network includes inductor windings on separate limbs of the parallel inductor limbs that are magnetically coupled to each other, and switching of the each parallel inductor legs is conducted using interleaved switching so that each inverter leg output voltage has pulses that are evenly phase distributed in a switching cycle.

14. The device of claim 11, wherein the inductor network is a coupled inductor network having cross-coupled inductor limbs and an output of each switch leg of the inverter circuit may have two windings connected in series where the two windings reside in separate magnetic flux paths.

15. The device of claim 11, wherein the inductor network includes parallel filter inductor limbs and the parallel filter inductor limbs are separate inductors that together provide a high frequency output current ripple and supply a current source to a load.

* * * * *